US008743887B2

(12) United States Patent
Balasubramanian et al.

(10) Patent No.: US 8,743,887 B2
(45) Date of Patent: Jun. 3, 2014

(54) METHODS AND APPARATUS FOR MOBILITY SUPPORT AND IP MULTIMEDIA SUBSYSTEM (IMS) REGISTRATION IN A MULTIMODE NETWORK ENVIRONMENT

(75) Inventors: Srinivasan Balasubramanian, San Diego, CA (US); Murali Bharadwaj, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 625 days.

(21) Appl. No.: 12/244,535

(22) Filed: Oct. 2, 2008

(65) Prior Publication Data
US 2009/0103455 A1    Apr. 23, 2009

Related U.S. Application Data

(60) Provisional application No. 60/978,749, filed on Oct. 9, 2007.

(51) Int. Cl.
*H04W 24/00* (2009.01)

(52) U.S. Cl.
USPC .................. 370/395.52; 370/395.53; 370/329

(58) Field of Classification Search
USPC ............... 370/395.52, 395.53, 329, 330, 351, 370/352, 353, 354, 355, 356, 357; 455/432.1, 433, 435.1, 435.2, 445, 455/450, 452.1, 451, 452.2, 509, 417, 414.1
See application file for complete search history.

(56) References Cited

U.S. PATENT DOCUMENTS

| | | | |
|---|---|---|---|
| 5,448,569 A | 9/1995 | Huang et al. | |
| 5,826,191 A | 10/1998 | Krishnan | |
| 5,870,673 A | 2/1999 | Haartsen | |
| 6,763,234 B1 | 7/2004 | Kabasawa | |

(Continued)

FOREIGN PATENT DOCUMENTS

| | | |
|---|---|---|
| CN | 1666454 A | 9/2005 |
| CN | 1902882 A | 1/2007 |

(Continued)

OTHER PUBLICATIONS

Latvakoski E J et al: "Application based access system selection concept for all IP mobile terminals" Globecom 02. 2002—IEEE Global Telecommunications Conference. Conference Proceedings. Taipei, Taiwan, Nov. 17-21, 2002; [IEEE Global Telecommunications Conference], New York, NY : IEEE, US, vol. 3, Nov. 17. 2002, pp. 2984-2988, XP010636293 ISBN: 978-0-7803-7632-8 the whole document.

(Continued)

*Primary Examiner* — Jean Gelin
(74) *Attorney, Agent, or Firm* — Abdollah Katbab

(57) ABSTRACT

Described aspects provide for improving the mobility of wireless communication devices between one network domain and another network domain, specifically, but not limited to, between a Wireless Local Area Network (WLAN) and a cellular network and the like. Present aspects provide for services to be moved seamlessly and in a reliable manner between the cellular and WLAN domains in order to minimize service disruption for the end user and provide the requisite Quality of Service (QoS) for the different applications. The aspects herein presented provide for various mechanisms that serve to improve the decision points related to when and what technology each service is expected to be associated with and provides better techniques to move the wireless communication device between cellular and WLAN domains when in-traffic and when idle.

30 Claims, 18 Drawing Sheets

(56) References Cited

U.S. PATENT DOCUMENTS

| | | | |
|---|---|---|---|
| 7,177,658 B2 | 2/2007 | Willenegger et al. | |
| 7,433,929 B2 | 10/2008 | Guilford et al. | |
| 7,539,373 B1 * | 5/2009 | Logvin et al. | 385/28 |
| 7,856,226 B2 * | 12/2010 | Wong et al. | 455/414.1 |
| 7,876,719 B2 * | 1/2011 | Bakker et al. | 370/310 |
| 8,170,534 B2 * | 5/2012 | Naqvi et al. | 455/414.1 |
| 2002/0119779 A1 | 8/2002 | Ishikawa et al. | |
| 2003/0207699 A1 | 11/2003 | Shpak | |
| 2003/0220900 A1 | 11/2003 | Gabor | |
| 2004/0137902 A1 | 7/2004 | Chaskar et al. | |
| 2005/0078642 A1 * | 4/2005 | Mayer et al. | 370/338 |
| 2005/0113109 A1 | 5/2005 | Adrangi et al. | |
| 2005/0238041 A1 | 10/2005 | Hsu et al. | |
| 2006/0077965 A1 * | 4/2006 | Garcia-Martin et al. | 370/352 |
| 2006/0109827 A1 | 5/2006 | Zhang | |
| 2006/0234705 A1 | 10/2006 | Oommen | |
| 2007/0076664 A1 | 4/2007 | An et al. | |
| 2007/0097879 A1 * | 5/2007 | Bleckert et al. | 370/254 |
| 2007/0153747 A1 | 7/2007 | Pan et al. | |
| 2007/0159976 A1 | 7/2007 | Dekeyzer et al. | |
| 2007/0218906 A1 | 9/2007 | Melia et al. | |
| 2007/0223516 A1 | 9/2007 | Dunn et al. | |
| 2008/0092224 A1 | 4/2008 | Coulas et al. | |
| 2008/0162637 A1 * | 7/2008 | Adamczyk et al. | 709/204 |
| 2008/0182575 A1 * | 7/2008 | Torres et al. | 455/435.1 |
| 2008/0267171 A1 * | 10/2008 | Buckley et al. | 370/352 |
| 2009/0052385 A1 * | 2/2009 | Sylvain et al. | 370/329 |
| 2009/0116447 A1 | 5/2009 | Balasubramanian et al. | |
| 2009/0323636 A1 * | 12/2009 | Dillon et al. | 370/331 |
| 2010/0098056 A1 * | 4/2010 | Falkena et al. | 370/352 |

FOREIGN PATENT DOCUMENTS

| | | |
|---|---|---|
| CN | 101039236 A | 9/2007 |
| EP | 1032237 | 8/2000 |
| JP | 7297841 A | 11/1995 |
| JP | 2001045533 A | 2/2001 |
| JP | 2002232929 A | 8/2002 |
| JP | 2006005658 A | 1/2006 |
| JP | 2007521773 A | 8/2007 |
| JP | 2009519648 | 5/2009 |
| KR | 20040069359 A | 8/2004 |
| KR | 20060020512 A | 3/2006 |
| KR | 1020060087069 A | 8/2006 |
| RU | 2288549 C2 | 11/2006 |
| RU | 2304853 C2 | 8/2007 |
| WO | 2005064833 A1 | 7/2005 |
| WO | 2005064883 A1 | 7/2005 |
| WO | 2004105256 A3 | 10/2005 |
| WO | WO2006001683 A1 | 1/2006 |
| WO | WO2006010312 A1 | 2/2006 |
| WO | WO2007045264 A1 | 4/2007 |

OTHER PUBLICATIONS

Partial International Search Report—PCT/US2008/078816. International Search Authority—European Patent Office—Jan. 26, 2009.
International Search Report—PCT/US2008/078835, International Search Authority—European Patent Office—Jan. 27, 2009.
Written Opinion—PCT/US2008/078835. International Search Authority—European Patent Office—Jan. 27, 2009.
Taiwan Search Report—TW097139018—TIPO—Nov. 21, 2011.

* cited by examiner

METHODS AND APPARATUS FOR MOBILITY SUPPORT AND IP MULTIMEDIA SUBSYSTEM (IMS) REGISTRATION IN A MULTIMODE NETWORK ENVIRONMENT

CLAIM OF PRIORITY UNDER 35 U.S.C. §119

The present application for patent claims priority to Provisional Application No. 60/978,749 entitled "WLAN and 2G/3G Mobility Support" filed Oct. 9, 2007, and assigned to the assignee hereof and hereby expressly incorporated by reference herein.

REFERENCE TO CO-PENDING APPLICATIONS FOR PATENT

The present application for patent is related to the following co-pending U.S. patent application Ser. No. 12/244,529 filed in the name of inventor Bharadwaj et al., having, filed concurrently herewith, assigned to the assignee hereof, and expressly incorporated by reference herein.

BACKGROUND

1. Field

The disclosed aspects relate to communications networks, and more particularly, to systems, methods and apparatus for providing mobility support in a multimode network environment.

2. Background

Wireless access terminals can include multiple communication protocols. Recently, access terminals have become multifunctional devices, frequently providing email, Internet access, as well as traditional cellular communications. Access terminals can be equipped with wide area wireless connectivity utilizing different technologies, such as third generation wireless or cellular systems (3G), Institute for Electrical and Electronic Engineers (IEEE) 802.16 (WiMax), and other to-be-defined Wireless Wide Area Network (WWAN) technologies. Meanwhile, IEEE 802.11 based Wireless Local Area Network (WLAN) connectivity is being installed in access terminals as well. On the horizon, ultra-wideband (UWB) and/or Bluetooth-based Wireless Personal Area Network (WPAN) local connectivity may also be available in access terminals.

Other examples of multiple communication protocols in an access terminal include a portable computer that may include a WPAN to connect the portable computer to a wireless mouse, a wireless keyboard, and the like. In addition, the laptop computer may include an IEEE 802.11b or 802.11g device to allow the portable computer to communicate with a WLAN. WLAN has become popular and, for example, is being set up in homes for both personal and business purposes. In addition, coffee shops, Internet cafes, libraries and public and private organizations utilize WLANs.

The number of networks and protocols continues to increase rapidly due to demands for functionality associated with unique user demands and divergent protocols. Such disparate networks and protocols are laborious for a user to switch between and in many cases, the user is trapped in a network without regard to what might be the optimal network for the user, and the user's associated network service and/or application, at a given time. In view of the foregoing, there is a need to provide for seamless transition between networks and/or protocols in order to minimize service disruption for the user. Additionally, a need exists to optimize the use of the different network domains such that the network service or application being used is provided the requisite Quality of Service (QoS).

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Present aspects define methods, systems, devices, apparatus and computer program products for improving the mobility of wireless communication devices between one network domain and another network domain, specifically, but not limited to, between a Wireless Local Area Network (WLAN), such as a WiFi network, a Bluetooth® network or the like, and a cellular network (i.e., circuit-switch and packet-switched domains), such as 1X, LTE, 2G, 3G cellular networks and the like. Present aspects provide for services to be moved seamlessly and in a reliable manner between the cellular and WLAN domains in order to minimize service disruption for the end user and provide the requisite Quality of Service (QoS) for the different applications. The aspects herein presented provide for various mechanisms that serve to improve the decision points related to when and what technology each service is expected to be associated with and provides better techniques to move the wireless communication device between cellular and WLAN domains when in-traffic and when idle.

A method for registering a wireless communication device for IP Multimedia Subsystem (IMS) services in a packet-based domain defines a present aspect. The method includes activating a packet-switch domain on a wireless communication device and determining that IMS services are supported over the packet-switch domain. The method further comprises determining if an Internet Protocol (IP) address assigned to an IMS application has changed based on IMS services determined to be supported and communicating an IMS registration request to a network entity within the packet-switch domain, if the IP address is determined to have changed.

In an alternate aspect of the method the IMS registration request may be a service-based IMS registration request that is operable to register one or more IMS services independent of registering other IMS services.

In another alternate aspect, the method may additionally include determining if IMS registration is current, if the IP address is determined to not have changed and communicating an IMS re-registration request to a network entity within the packet-switch domain, if the IMS registration is determined to not be current. In such aspects the IMS re-registration request provides for a quick refresh of the previous established IMS registration credentials. In such aspects of the method the IMS re-registration request may be a service-based IMS re-registration request that is operable to re-register one or more IMS services independent of re-registering other IMS services.

Another alternate aspect of the method may include activating the circuit-switch domain if it is determined that the device supports a circuit-switched domain and communicating a message to a network entity in the circuit-switched domain that is operable to inform the circuit-switched domain that all network services are to be provided by the circuit-switched domain. In such aspects the method may also include maintaining an IMS registration in the packet-switch domain while network services are provided by the circuit-switch domain.

Additionally, in one alternate aspect the method may include receiving a first page on the packet-switch domain while active on the circuit-switch domain, and, sequentially receiving a second page on the circuit-switch domain. \

It should be noted that while the present aspects are described herein in conjunction with IMS registration and registration, the aspects are also relevant to other services that may require registration on a packet-switched domain, such as a WLAN domain or the like.

A further aspect is provided for by at least one processor configured to register a wireless communication device for IP Multimedia Subsystem (IMS) services in a packet-based domain. The processor includes a first module for activating a packet-switch domain on a wireless communication device and a second module that determines that IMS services are supported over the packet-switch domain. The processor additionally includes a third module for determining if an Internet Protocol (IP) address assigned to an IMS application has changed, if IMS services are determined to be supported and a fourth module for communicating an IMS registration request to a network entity within the packet-switch domain, if the IP address is determined to have changed.

Another aspect is defined by a computer program product having a computer-readable medium. The medium includes a first set of codes for causing a computer to activate a packet-switch domain on a wireless communication device and a second set of codes for causing the computer to determine that IMS services are supported over the packet-switch domain. The medium additionally includes a third set of codes for causing the computer to determine if an Internet Protocol (IP) address assigned to an IMS application has changed, if IMS services are determined to be supported and a fourth set of codes for causing the computer communicate an IMS registration request to a network entity within the packet-switch domain, if the IP address is determined to have changed.

An apparatus defines another aspect. The apparatus includes means for activating a packet-switch domain on a wireless communication device and means for determining that IMS services are supported over the packet-switch domain. The apparatus also includes means for determining if an Internet Protocol (IP) address assigned to an IMS application has changed, if IMS services are determined to be supported and means for communicating an IMS registration request to a network entity within the packet-switch domain, if the IP address is determined to have changed.

A wireless communication device provides for another aspect. The wireless communication device includes a computer platform including a processor and a memory in communication with the processor. The device also includes a packet-switch domain module stored in the memory and in communication with the processor. The packet-switch domain module is operable to be activated on the wireless communication device. The device also includes an IP Multimedia Subsystem (IMS) services module stored in the memory and in communication with the processor. The IMS services module is operable to determine that the activated packet-switch domain supports IMS services. The IMS services module includes an IP address determiner that is operable to determine if the IP address assigned to an IMS application has changed and an IMS registration routine operable to determine if the IP address is determined to have been changed, and communicate an IMS registration request to a network entity in the packet-switch domain, if the IP address is determined to have been changed.

In one aspect of the wireless device the IMS registration routine is further operable to communicate a service-based IMS registration request that is operable to register one or more IMS services independent of registering other IMS services.

In another alternate aspect of the wireless device the IMS services module further comprises an IMS currency determiner operable for determining if IMS registration is current, if the IP address determiner determines that the IP address is not changed. In such aspects, the IMS services module may include an IMS re-registration routine operable for communicating an IMS re-registration request to a network entity within the packet-switch domain, if the IMS registration is determined to not be current. In such aspects the re-registration request is defined as quick refresh of the previous established IMS registration credentials. Additionally, in some aspects the re-registration request may be a service-based IMS re-registration request that is operable to re-register one or more IMS services independent of re-registering other IMS services.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote the elements, and in which.

DETAILED DESCRIPTION

Figure 1:
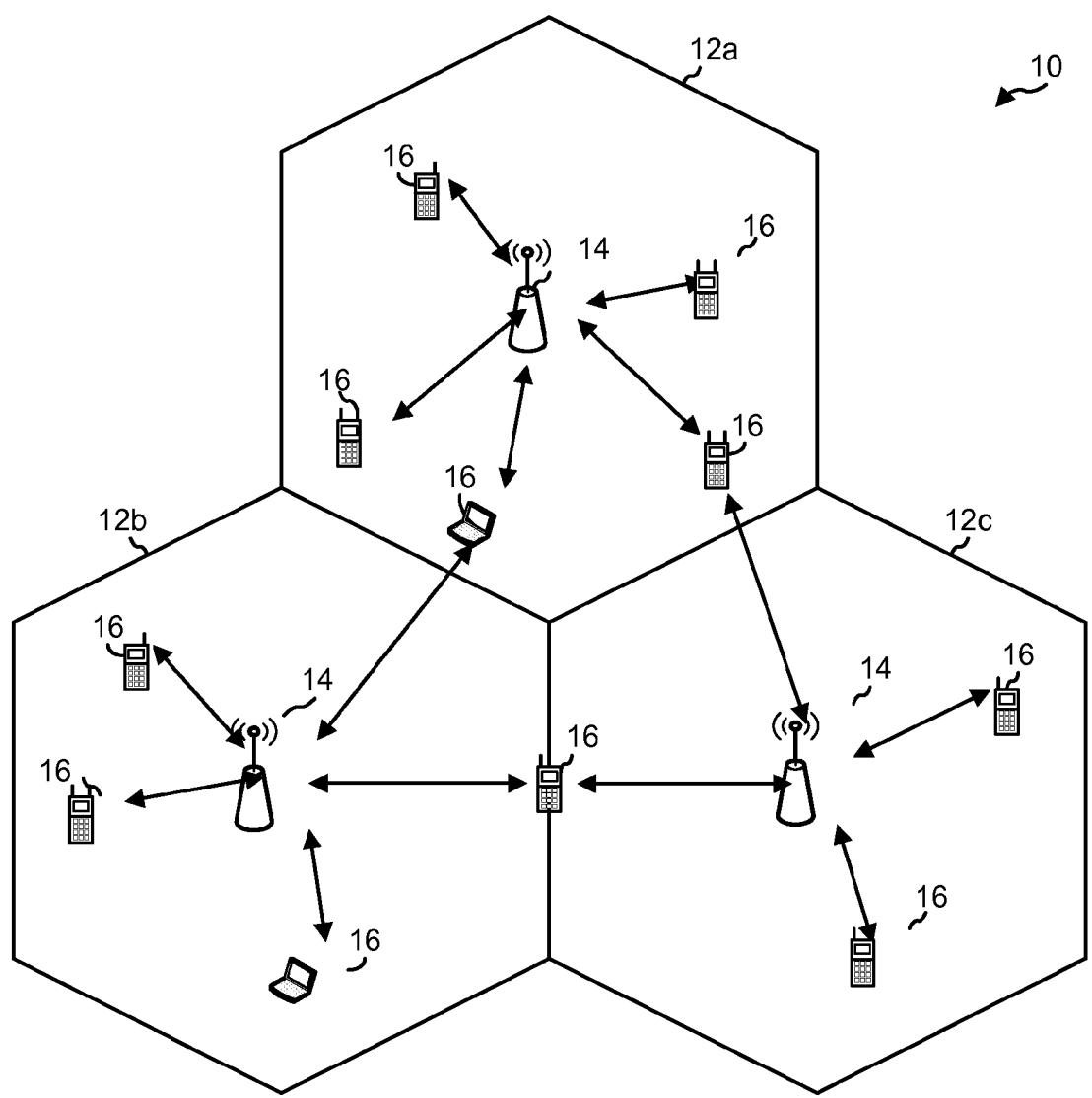
FIG. 1 is an exemplary cellular wireless communication system implemented in accordance with present aspects.

Various aspects are now described with reference to the drawings. In the following description, for purposes of explanation, numerous specific details are set forth in order to provide a thorough understanding of one or more aspects. It may be evident; however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a communication device, which can be a wired terminal or a wireless terminal. A communication can also be called a system, device, subscriber unit, subscriber station, mobile station, mobile, mobile device, remote station, remote terminal, access terminal, user terminal, terminal, user agent, user device, or user equipment (UE). A wireless communication device may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM□, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

FIG. 1 illustrates an exemplary wireless communication system 10, such as a cellular communication network configured to support a number of users, in which various disclosed aspects may be implemented. As shown in FIG. 1, by way of example, system 10 provides for multiple cells such as cells 12A-12C each cell being serviced by a corresponding access point (AP) 14. Each cell may be further divided into one or more sectors (not shown in FIG. 1). Various wireless communication devices 16, also interchangeably referred to ad access terminals (ATs) are dispersed throughout the system. Each wireless communication device 16 may communicate with one or more APs on a forward link (FL) and/or a reverse link (RL) at a given moment, depending upon whether the wireless device is active and whether it is in soft handoff, for example.

Figure 2:
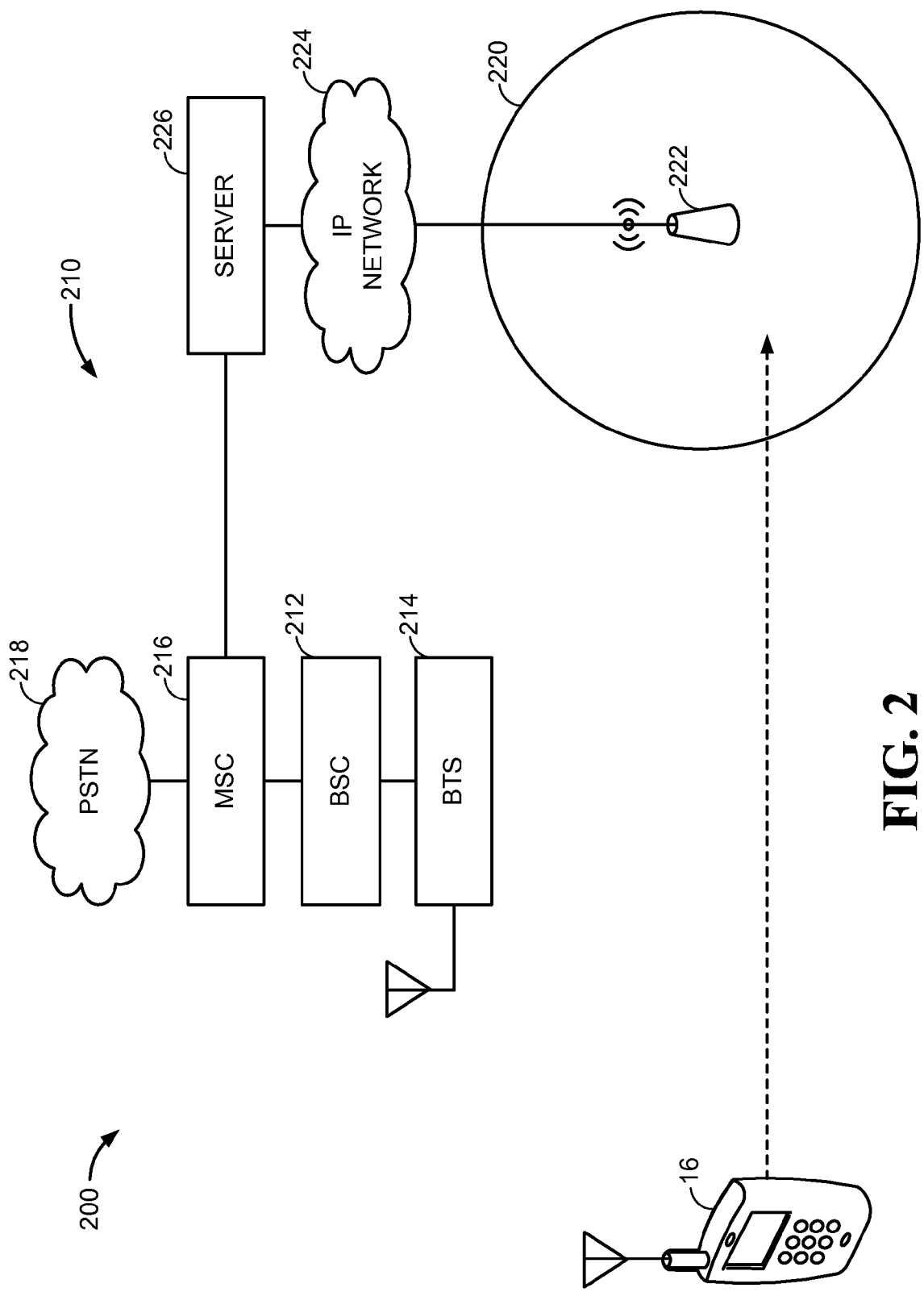
FIG. 2 is an exemplary cellular and Wireless Local Area Network (WLAN) communication system implemented in conjunction with present aspects.

FIG. 2 is a conceptual block diagram of a multi-domain wireless communications system 200 including a cellular network and a WLAN, according to present aspects. A wireless communication device 16 is shown moving through a wide area cellular network 210 by a series of broken lines.

The cellular network 210 (e.g., a first domain) includes a Base Station Controller (BSC) 212 supporting a number of Base Transceiver Stations (BTSs) dispersed throughout the cellular coverage region. A single BTS 214 is shown in FIG. 2 for simplicity of explanation. A Mobile Switching Center (MSC) 216 may be used to provide a gateway to a public switched telephone network (PSTN) 218. Although not shown in FIG. 2, the cellular network 210 may employ numerous BSCs each supporting any number of BTSs to extend the geographic reach of the cellular network 210. When multiple BSCs are employed throughout the cellular network 210, the MSC 216 may also be used to coordinate communications between the BSCs.

The wireless communication system 200 may also include one or more wireless LANs 220 (i.e., a second domain) dispersed throughout the cellular coverage region. A single wireless LAN 220 is shown in FIG. 2. The wireless LAN 220 may be an IEEE 802.11 network, or any other suitable network. The wireless LAN 220 includes an access point 222 for the wireless communication device 16 to communicate with an IP network 224. A server 226 may be used to interface the IP network 224 to the MSC 216, which provides a gateway to the PSTN 218.

Domain Acquisition Thresholds

Figure 3:
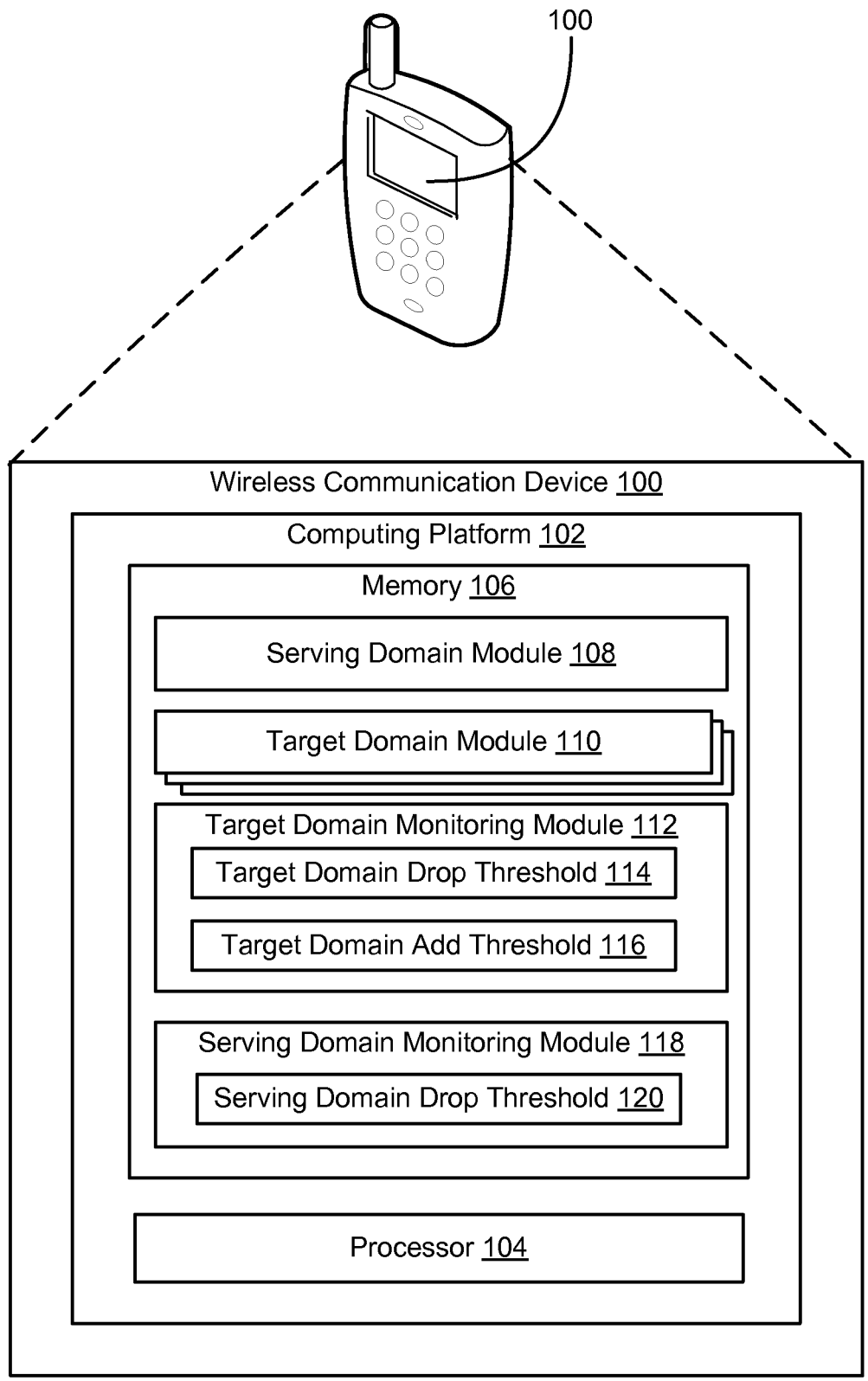
FIG. 3 is a block diagram of a wireless communication device configured to provide two levels of acquisition thresholds based on the current performance experienced over the domains, according to a present aspect.

Referring to FIG. 3 a block diagram of a wireless communication device 100 is depicted that is configured to provide two levels of acquisition thresholds based on the current performance experienced over the domains, according to a present aspect. The wireless communication device 100 includes a computing platform 102 having at least one processor 104 and a memory 106. The wireless communication device 100 is configured for multimode communications and, as such, memory 106 includes a serving domain module 108 and at least one target domain module 110. In certain aspects, the serving domain module 108 may be Wireless Local Area Network (WLAN) domain module, such as a Wireless Fidelity (Wi-Fi) domain module, a Bluetooth® domain module or the like. In such aspects, the target domain module 110 may be a cellular network domain module, such as circuit switched $2^{nd}$ Generation (2G) cellular domains, packet-switched 3rd Generation (3G) cellular domains, such as 1X cellular domain module, for example a WiMax cellular domain module, a Long Term Evolution (LTE) cellular domain, or the like. In alternate aspects, the serving domain module 108 may be a cellular network domain module and the target domain module 110 may be a WLAN domain module. While in other aspects, the serving domain module 108 and/or target domain module may modules related to network domains other than WLAN or cellular networks.

In such aspects, in which the serving domain module 108 is a WLAN domain module and the target domain module 110 is a cellular domain module, the serving/WLAN domain may be configured to be the preferred domain over which the device prefers to communicate based on the availability of the serving/WLAN domain. In alternate aspects, the target/cellular network may be configured to be the preferred domain.

Memory 106 additionally includes a target domain monitoring module 112 that includes one or more target domain add thresholds 114 and one or more target domain drop thresholds 116. In most instances each target domain will have an add threshold 114 and a corresponding related drop threshold 116. The target domain add threshold 114 signifies a limit at which, if equaled or exceeded, the target domain may be considered for activation or otherwise activated. As such the target domain add threshold may be associated with one or a combination of performance parameters such as, but not limited to, Received Signal Strength Indicator (RSSI), packet error rate, retransmission rate of packets, Quality of Service (QoS) and the like. The target domain drop threshold 116 signifies a limit at which, if equaled or exceeded, the target domain may be considered for de-activation or otherwise de-activated.

In accordance with present aspects, the target domain monitoring module 112 is operable to determine when the wireless communication device 100 is currently operating in a target domain state that is above a target domain drop threshold 116 and below the corresponding target domain add threshold 114. For example, if the target domain add threshold 114 is defined as a signal strength value of 12 dBM and the target domain drop threshold is defined as a signal strength value of 16 dB, the target domain monitoring module 112 is operable to determine when the wireless communication device 100 is operating in a signal strength state defined as between 12 dBM and 16 dBM. It should be noted that the thresholds may be configured such that meeting a threshold may include values below the threshold, above the threshold and/or equal to the threshold.

Memory 106 additionally includes a serving network monitoring module 118 that includes one or more serving domain drop thresholds 120. Each serving network drop threshold corresponding to a related network domain. The serving domain drop threshold 120 signifies a limit at which, if equaled or exceeded, the target domain may be considered for de-activation or otherwise de-activated.

In accordance with present aspects, the serving domain monitoring module 118 is operable to determine when the wireless communication is currently operating in a serving domain state that is approaching a serving network drop threshold 120. By determining when the wireless communication is currently operating in a serving domain state that is approaching a serving network drop threshold 120, the device can determine when a continuous use service, such as a voice call or the like is about to be dropped or any other service supported by the domain is otherwise about to be discontinued.

In this regard, the serving domain monitoring module 118 may be operable to monitor one or more performance parameters, for example, Medium Access Control (MAC) layer or application layer performance parameters and, based on the trends of the performance parameters, determine if the wireless device is currently approaching a serving network drop threshold 120. The one or more serving network drop thresholds may be associated with one or a combination of RSSI, uplink or downlink MAC or application layer packet error rate, uplink MAC or application layer packet retry rate or the like. Thus, in one aspect, if the serving domain monitoring module 118 determines that the RSSI is decreasing at a predetermined rate, the MAC and/or application layer packet error rate is increasing at a predetermined rate and/or the MAC packet retry attempts are increasing at a predetermined rate and/or some other performance parameter is degrading at a predetermined rate, the serving domain monitoring module 118 may conclude that the wireless device is currently residing in a serving domain state that is approaching but has to meet or exceed the serving domain drop threshold 120.

Thus, according to present aspects, the target domain module 110 may be activated or a handoff to the target domain may occur if the target domain state is currently residing above a target domain drop threshold 114 and below a target domain add threshold 116 and if the serving domain state is currently approaching, but has not yet met, a serving network drop threshold 120.

This level of domain acquisition is particularly suited for activation/handoff to the target domain in instances in which the wireless communication device is currently implementing a continuous-use application, such as a voice call application, a Short Message Service (SMS) application, a Push-To-Talk (PTT) application or the like. In such continuous-use applications, it may be beneficial for the wireless device 100 to activate or otherwise move to the target domain even though the wireless device currently resides below the target domain add threshold 116 (but above the target domain drop threshold 114), if the wireless device is currently residing in a serving domain state that indicates that serving domain is approaching a serving domain drop threshold 120 (e.g., the voice call is about to be dropped or the like).

Figure 4:
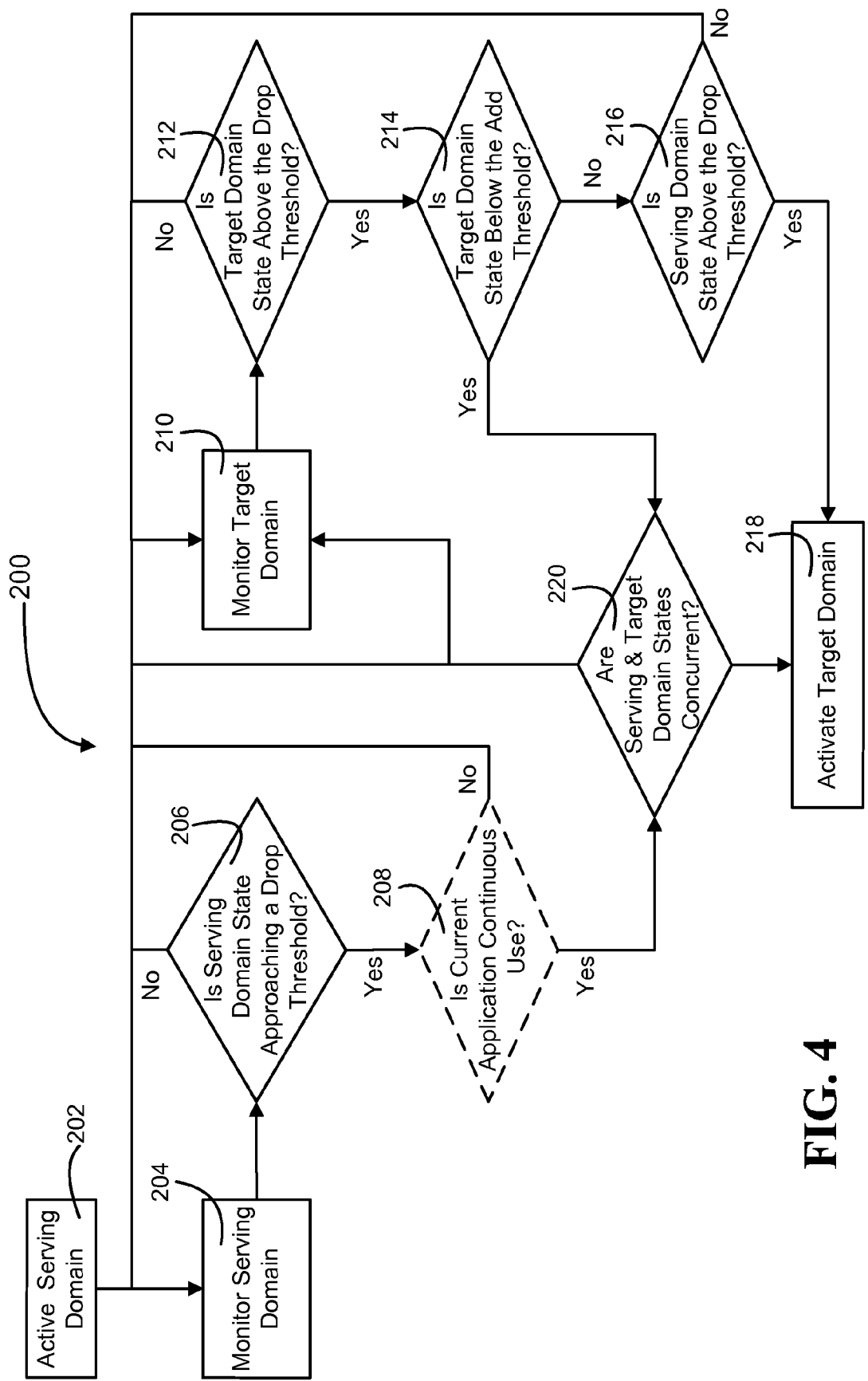
FIG. 4 is a flow diagram of a methodology for activating a target domain in a multimode wireless communication device, according to an aspect.

FIG. 4 depicts a flow diagram of a methodology 200 for activating a target domain in a multimode wireless communication device, according to an aspect. At Event 202, the wireless communication device is actively communicating with a serving domain. As previously noted, the serving domain may be a WLAN domain, a cellular domain or any other known or future known network domain. In one aspect, in which the WLAN domain is the preferred domain, the serving domain may be the WLAN domain. At Event 204, the performance of the serving domain is monitored. Monitoring of the serving domain may include but is not limited to RSSI value, uplink and/or downlink MAC layer packet error rate, uplink and/or downlink application layer packet error rate, MAC layer packet retries and the like.

At Decision 206, a determination is made as to whether the serving domain state is approaching, but has not yet met or exceeded, a serving domain drop threshold. The determination of whether a drop threshold is being approached may include, but is not limited to, determining whether RSSI is decreasing at a predetermined rate, determining if uplink and/or downlink MAC layer packet error rate is increasing at a predetermined rate, determining if uplink and/or downlink application layer packet error rate is increasing at a predetermined rate, determining if MAC layer packet retries are increasing at a predetermined rate, a combination of any of these performance parameter rates or the like. If the monitoring determines that the serving domain state is not currently approaching a drop threshold then, the process returns to Event 204 for further serving domain monitoring.

If monitoring determines that the serving domain state is currently approaching a drop threshold, at optional Decision 208, a determination is made as to whether the current application being implemented on the serving domain is a continuous use application. In certain aspects the target domain activation methodology shown in FIG. 4 is limited to continuous use applications. Continuous use applications include, but are not limited to, voice call applications, SMS applications, PTT applications and the like. If the current application is determined to not be a continuous use application the process returns to Event 204, for further monitoring of the serving domain performance. In other aspects, the process depicted in FIG. 4 may apply to all applications being implemented on the serving domain and, therefore the need to determine whether the application is a continuous use application is obviated. It should also be noted that in those aspects which implement a continuous use application check the occurrence of the check is not limited to a specific point in the process flow but rather may occur at any point in time prior to activating the target domain.

At Event 210, monitoring of one or more target domains occurs in parallel with the monitoring of the serving domain (event 204). The monitoring of the target domain may include monitoring of any performance parameter associated with a target domain drop threshold and/or a target domain add threshold. Monitoring of the target domain may include but is not limited to RSSI value, uplink and/or downlink MAC layer packet error rate, uplink and/or downlink application layer packet error rate, MAC layer packet retries and the like. At Decision 212, a determination is made as to whether the current target domain state is above a target domain drop threshold. If the target domain state is determined to be below the target domain drop threshold, the process returns to Event 210 for further monitoring of the target domain.

If the target domain state is determined to be above the target domain drop threshold then, at Decision 214, a determination is made as to whether the target domain state is currently below the corresponding target domain add threshold. If the target domain state is determined to be above the corresponding add threshold, at Decision 216, a determination is made as to whether the serving domain state is currently above the drop threshold. If the serving domain drop threshold has been met or exceeded, then at Event 218 the target domain is activated. If the serving domain drop threshold has not been met or exceeded, the process returns to Events 204 and 210 for further monitoring of the serving domain and the target domain If, at Decision 218, the target domain state is determined to be below the corresponding add threshold, at Decision 220 a determination is made as to whether the serving domain state is approaching the drop threshold and the target domain state is concurrently between the target domain drop threshold and the target domain add threshold. If the necessary serving domain state and target domain state are concurrent then, at Event 218 the target domain is activated. If the necessary target domain state and the serving domain state are not current, the process returns to Events 204 and 210 for further monitoring of the serving domain and the target domain.

Figure 5:
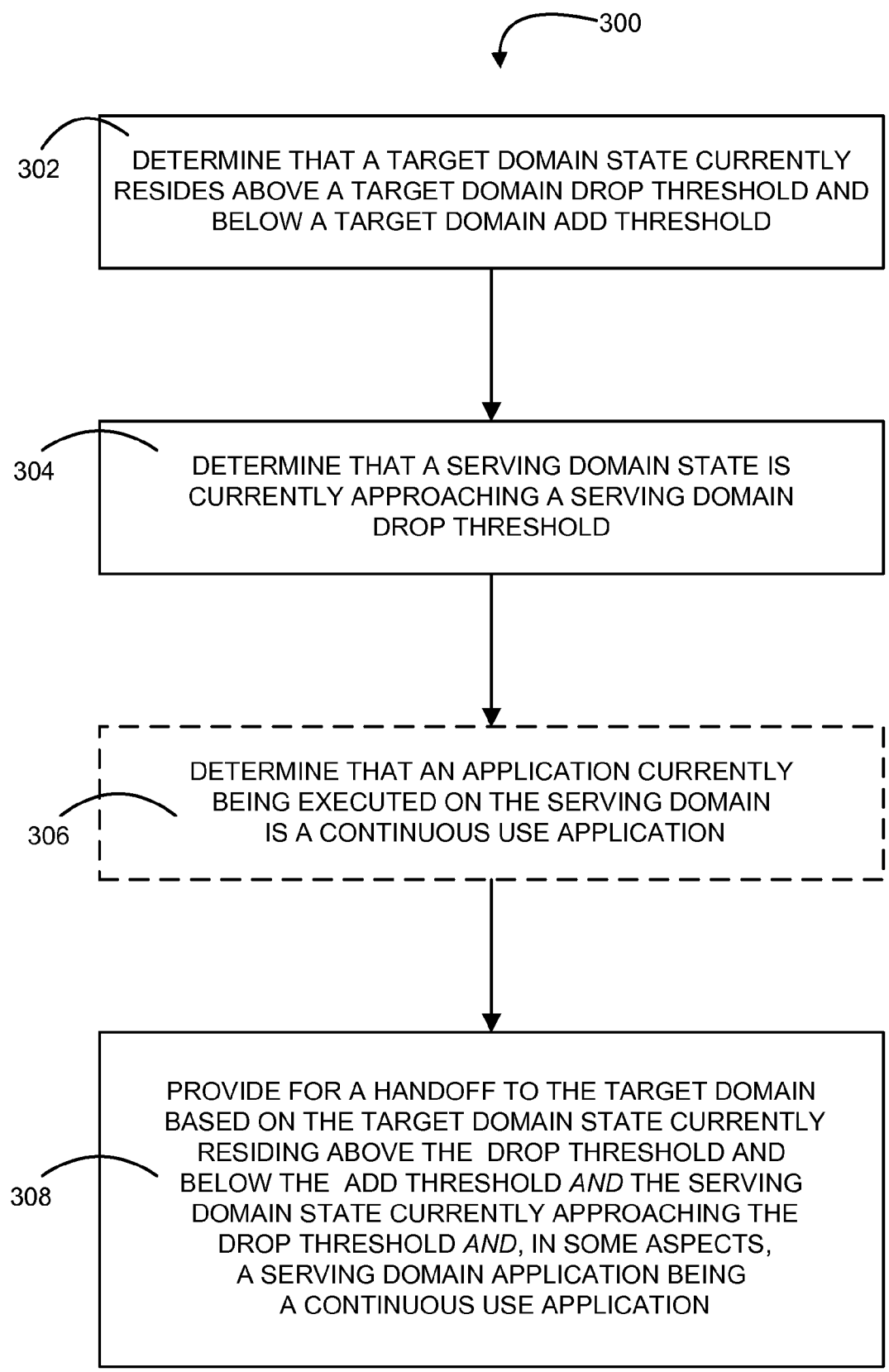
FIG. 5 is a flow diagram of another methodology for activating a target domain in a multimode wireless communication device, according to an aspect.

Referring to FIG. 5 another flow diagram is depicted that illustrates another methodology 300 for activating a target domain in a multimode wireless communication device, according to an aspect. At Event 302, a determination is made that a target domain state currently resides above a target drop threshold and below a corresponding target domain add threshold. It should be noted that above or below a threshold may include meeting the threshold, proximate to the threshold in the event the threshold does not account for a hysteresis level or within a predefined range between the target domain drop threshold and the target domain add threshold. The target domain add and drop thresholds may be based on one or a combination of performance parameters, such as, but not limited to, RSSI value, uplink and/or downlink MAC layer packet error rate, uplink and/or downlink application layer packet error rate, MAC layer packet retries and the like.

At Event 304, a determination is made that a serving domain state is currently approaching a serving domain drop threshold. The determination of whether the serving domain state is currently approaching a drop threshold may be made based on the degrading rate of one or a combination of performance parameters. The performance parameter rates used to determine that the domain state is approaching a drop threshold may include, but are not limited to, RSSI decreasing at a predetermined rate, uplink and/or downlink MAC layer packet error rate increasing at a predetermined rate, uplink and/or downlink application layer packet error rate increasing at a predetermined rate, MAC layer packet retries increasing at a predetermined rate, any combination of performance parameter rates or the like.

At optional Event 306, a determination may be made that an application currently being executed on the serving domain is a continuous use application. An application deemed to be continuous use, such as cellular service, SMS, push-to-talk or the like, requires uninterrupted service and therefore is especially suited for a handover/activation of a target domain prior to the serving domain reaching the drop threshold and prior to the target domain reaching the add threshold. In certain aspects, the methodology herein described may only be administered if a continuous use application is currently being executed on the wireless device. In other aspects, the methodology herein described may apply in all instances, regardless of continuous use application deployment.

At Event 308, handoff/activation is provided to the target domain based one the target domain currently residing above the drop threshold and below the add threshold and the serving domain state concurrently approaching the drop threshold. In addition, in some aspects the handoff/activation may also be conditioned based on currently executing serving domain application being a continuous use application.

Independent Domain Acquisition Thresholds and Domain Service Acquisition Thresholds In certain aspects acquisition of target domain may not coincide with activation of all of the services available to the user on the target domain. In such instances, one or more, and possibly all of the available services may have individual add thresholds that must be met or otherwise exceeded for the service to be available to the user. Thus, according to one aspect, the target domain add threshold may correspond to the add threshold of the service available of the target domain that has the lowest add threshold. For example, in one instance in which the target domain is a WLAN domain, a certain domain add threshold may correspond to data service add threshold, such that activation of the WLAN domain initially provides for offloading data via the data service. However, the WLAN domain may not register for a voice service or the like until network performance has improved as determined by the service add threshold having been met or exceeded. Thus, according to described aspects, the activation of the target domain may be independent of service operation on the target domain. In addition to individual add thresholds for the services available on the domain, individual drop thresholds may also be configured on a per service basis. The individual add thresholds and drop thresholds for services provided on the domain depend on the application type and the level of service required by the application.

Figure 6:
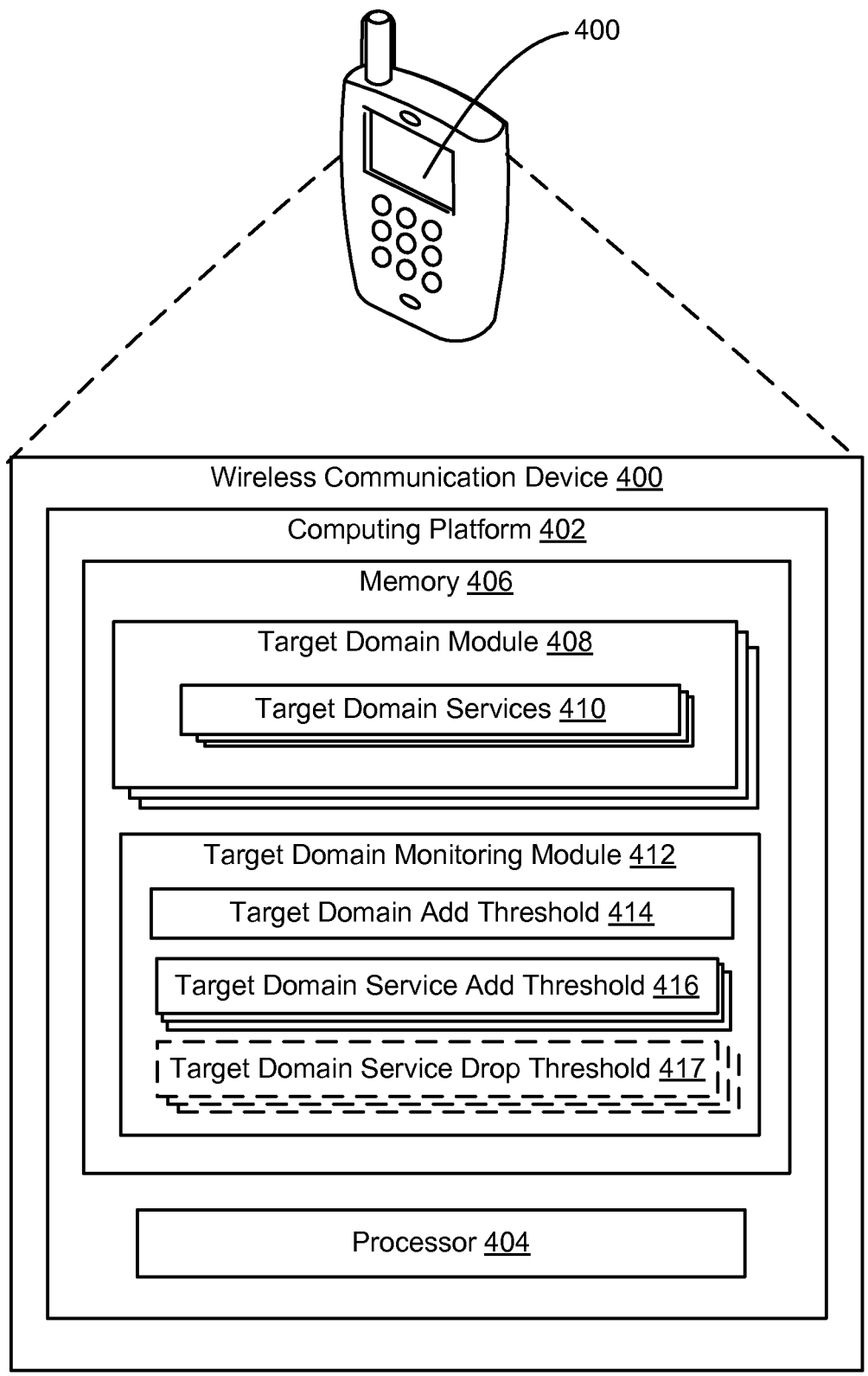
FIG. 6 is a block diagram of a wireless communication device configured to provide independent target domain activation and target domain service activation, according to an aspect.

FIG. 6 is a block diagram representation of a wireless communication device configured to provide independent target domain activation and target domain service activation/deactivation; according to an aspect. The wireless communication device 400 includes a computing platform 402 having at least one processor 404 and a memory 406. The memory 406 of wireless communication device 400 includes a target domain module 408, which may be a Wireless Local Area Network (WLAN) domain module, such as a Wireless Fidelity (Wi-Fi) domain module, a Bluetooth® domain module or the like. In other aspects, the target domain module 408 may be a cellular network domain module, such as circuit switched $2^{nd}$ Generation (2G) cellular domains, packet-switched 3rd Generation (3G) cellular domains, such as 1X cellular domain module, for example a WiMax cellular domain module, a Long Term Evolution (LTE) cellular domain, or the like. In alternate aspects, the target domain module 408 may be a domain module other than the WLAN or cellular network module.

The target domain module 408 may include one or more target domain services 410 that may be implemented on the target domain. Examples of service applications include, but are not limited to, voice service, data service, video service and the like.

The memory 406 of wireless communication device 400 also includes a target domain monitoring module 412 that is operable to monitor one or more performance parameters related to the domain. The performance parameters may include, but are not limited to, RSSI value, uplink and/or downlink MAC layer packet error rate, uplink and/or downlink application layer packet error rate, MAC layer packet retries and the like. The target domain monitoring module includes a target domain add threshold 414 one or more target domain service add thresholds 416, and, optionally, one or more corresponding target domain service drop thresholds 417. Each target domain service add threshold 416 and optional target domain service drop threshold is associated with a corresponding service provided on the target domain. The target domain add threshold 410 is operable to activate the target domain on the wireless device when the threshold has been met or exceeded. The target domain service add thresholds 416 are operable to activate the individual target domain services available on the wireless device when the associated add threshold has been met or exceeded. The target domain service drop thresholds 417 are operable to deactivate the individual target domain service on the wireless device when the associated drop threshold has been met or falls below the drop threshold.

The service add thresholds are independent of the domain add thresholds and as such activation or handoff to the target domain may not coincide with activation of all of the services available on the target domain. This may be because the performance quality of the domain has not yet reached a level that will reliably sustain the service on the target domain or other factors.

In one specific aspect, the target domain service having the lowest service add threshold may correspond to the target domain add threshold 414. Such that when the add threshold for the service having the lowest add threshold, e.g. the least complex service, is met or exceeded, the target domain threshold is activated or a handoff to the target domain occurs. Once activated, as the performance of the target domain improves, more complex services may be activated.

Additionally, according to certain aspects, the target domain add thresholds and the target domain service add thresholds may be dynamically changed independent of each other. Thus, a network operator or in some aspects the user of the wireless device may adjust add thresholds based on network performance, user level of acceptable quality or any other factor. In this regard, once the target domain has been activated a user may adjust the threshold for a given service upward or downward to meet their own acceptable level of service quality or to insure that a service is readily available on demand.

It should also be noted that in certain aspects in which the target domain is activated but is subsequently unable to attain an add threshold related to a service that a user of the device requires, the device may be configured to monitor the performance of other target domains available to the user that may support the desired service. For example, if the initial target domain is a WLAN domain that is activated based on the target domain add threshold being met but is currently unable to support voice service because the add threshold associated with the voice service application has yet to be attained, the wireless device may monitor the performance of another domain, such as a cellular domain and choose to activate the other domain to provide the requisite service, such as the voice service in the described example. For example, the target network domain may be activated and meet the threshold for providing Best Effort (BE) data traffic but does meet the threshold for providing Voice Over IP (VOIP) service. In such instances, the device may activate another target domain (or if concurrently activated, choose to implement the other network domain) to provide the VOIP network service. The other target domain may require a threshold to be met to use the VOIP service or the other target domain may allow the VOIP service to be used without threshold limitations.

Figure 7:
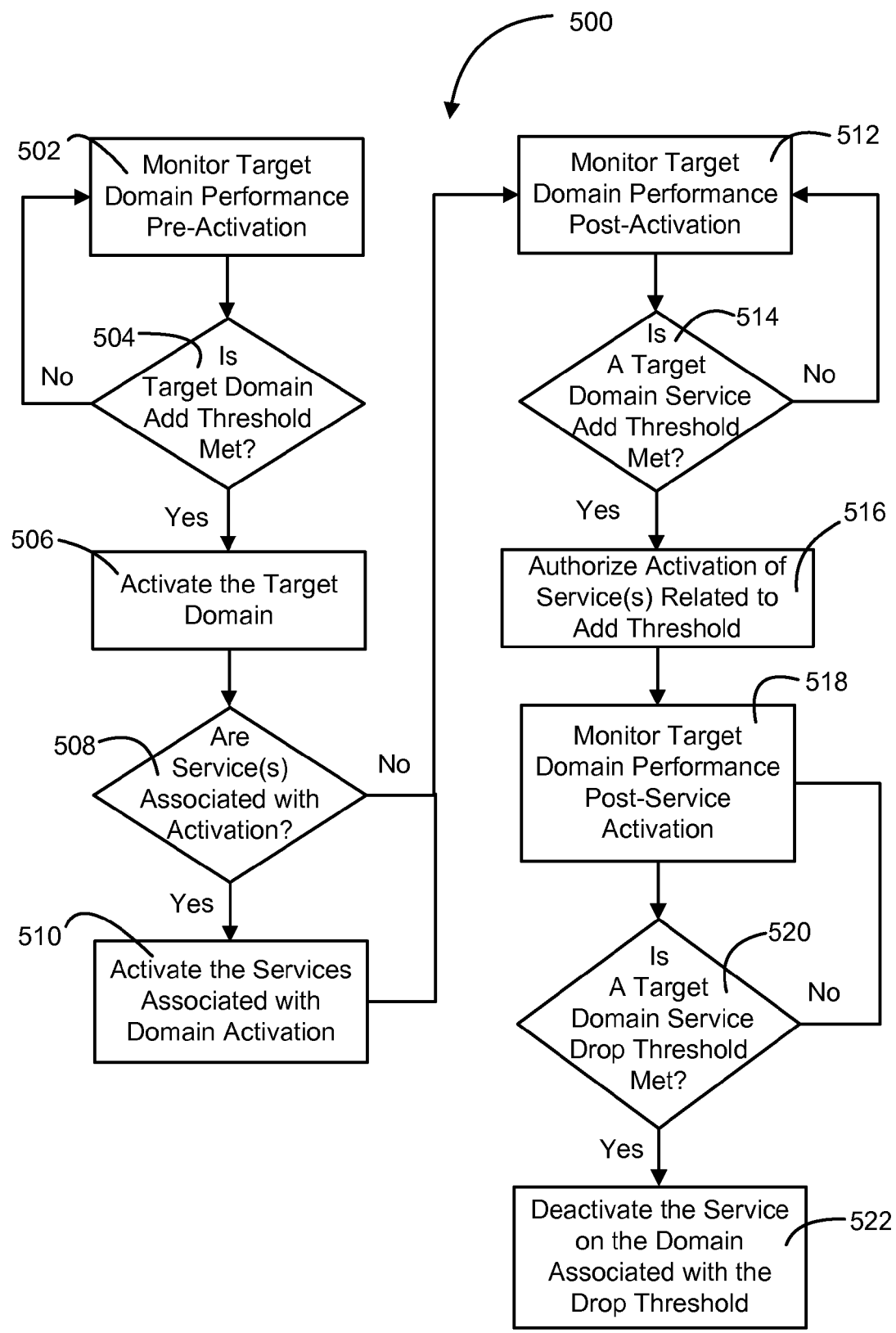
FIG. 7 is a flow diagram of a methodology for providing independent target domain activation and target domain service activation, according to an aspect.

FIG. 7 provides a flow diagram of a methodology 500 for independent target domain acquisition thresholds and target domain-service acquisition thresholds, according to an aspect. At Event 502, the wireless device monitors target domain performance prior to activation of the target domain. It should be noted that in this instance the term "target domain" does not necessarily imply that a serving domain currently be active. Thus, the wireless communication device may not have an active connection with a domain prior to activation of the target domain. Additionally, in soma aspects, the target domain will be a WLAN domain although in other aspects the target domain may be any other type of wireless network domain. Monitoring of the target domain performance may include monitoring of one or more performance parameters. Performance parameters may include, but are not limited to, RSSI, uplink or downlink MAC or application layer packet error rate, uplink MAC or application layer packet retry rate or the like.

At Decision 504, based on a desire to activate the target domain a determination is made as to whether the target domain add threshold has been met or exceeded. The target domain add threshold may be based on one or a combination of performance parameters. If the add threshold has not been met or exceeded, the process returns to Event 502 for further monitoring of the target domain. If the target domain add threshold has been met or exceeded the, at Event 506, the target domain is activated or a handoff to the target domain occurs.

In certain aspects, the target domain add threshold may be equivalent to the lowest add threshold for one or more services available on the target domain. Therefore, at Decision 508 a determination is made as to whether one or more services are associated with the activation. Association with the activation being defined as having an equivalent service add threshold, such that activation of the domain also activates one or more services having the equivalent add threshold. If it is determined that services are associated with the activation of the target network, then At Event 510, the associated service(s) are activated on the wireless device or the user is otherwise provided authorization to access the services.

If it is determined that services are not associated with the activation or after the associated services are activated then, at Event 512, the target domain is monitored post activation. At Decision 514, a determination is made as to whether a target domain service add threshold has been met. As previously noted, according to defined aspects, certain services available on the target domain may be more complex services that require a higher level of network performance quality to reliably sustain the service. In these instances, the service may have individual add thresholds that are higher than the add threshold of the target domain. Therefore, the wireless device may activate the target domain without initially being provided access to one or more services, which have higher add thresholds than the domain add threshold. Thus, it is contemplated that that the device may activate the target domain and that the level of target domain performance necessary for a complex service may not be attained during the active target domain session.

If it is determined that a target domain service add threshold has not been met, then the method returns to Event 512 for further post-activation monitoring of the target domain. If it is determined that a target domain service add threshold has been met then, at Event 516, the service(s) associated with the add threshold is activated or the service is authorized to be activated on the target domain. Once the service(s) has been activated, at Event 518, target domain performance is further monitored post-service activation. At Decision 520, a determination is made as whether the drop threshold associated with the services that have been activated has been met or falls below the drop threshold. If the drop threshold for the service has not been met or falls below the drop threshold, the process returns to Event 518 for further post-service activation monitoring of the performance of the target domain. If the drop threshold for the service(s) has been met, at Event 522, the service or services associated with the drop threshold may be deactivated on the target domain. It should be noted that different domain services may have different add thresholds and drop thresholds and, as such, while not indicated in the methodology of FIG. 7, some services may be activated while other services have yet to be activated or other services are being de-activated.

Figure 8:
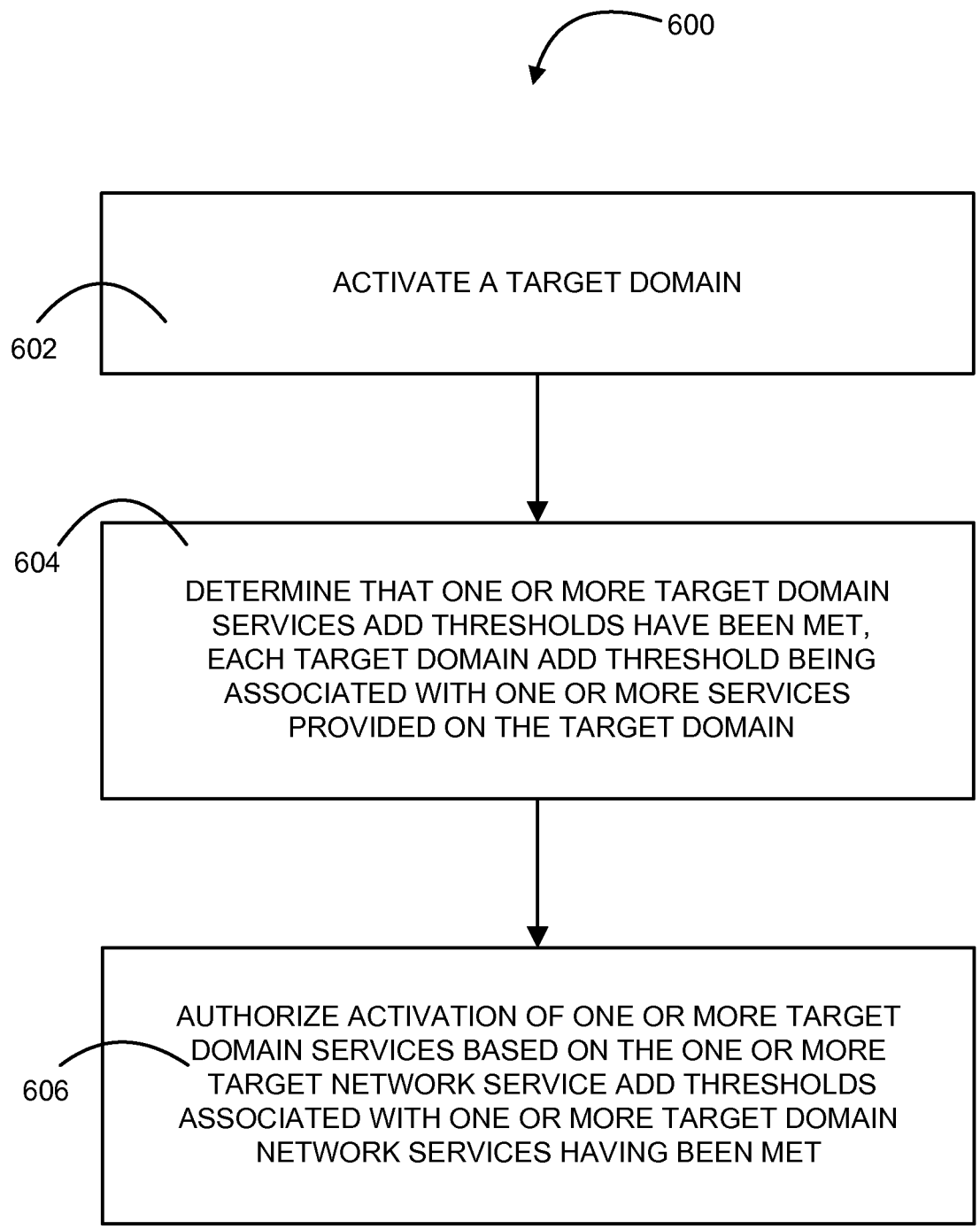
FIG. 8 is a flow diagram of another methodology for providing independent target domain activation and target domain service activation, according to an aspect.

Referring to FIG. 8, a flow diagram is depicted of a methodology 600 for activating a target domain and independently activating network services on the target domain. At Event 602, the target domain is activated. In one aspect, the target domain may be activated based on a target domain add threshold being met or exceeded, while in other aspects the target domain may be activated based on other criteria or user action.

At Event 604, once the target domain is activated, a determination is made that one or more target domain service add thresholds have been met or exceeded. Each target domain service add thresholds are associated with one or more services available on the target domain. At Event 606, the one or more target domain services are authorized to be activated based on the one or more target domain service add thresholds being met or exceeded. Thus, in accordance with aspects activation of the target domain is independent of activation of at least one service available on the target domain. In certain aspects, determining that a target domain service add threshold has been met may further provide for monitoring one or more performance parameters associated with the domain service. Examples of performance parameters that may be monitored include, but are not limited to, Received Signal Strength Indication (RSSI), uplink data packet error rate, downlink data packet error rate or uplink transmission retries for a channel operative to provide an associated target network service.

In one aspect in which the target domain is activated based the target domain add threshold being met, the target domain add threshold may correspond or otherwise be equal to a lowest add domain service threshold for a service available on the target domain. In such aspects, the target domain may be activated when the service having the lowest add threshold is met and the target domain and the corresponding service are initially activated; additional services may be subsequently authorized to be activated as their corresponding target service add thresholds are met.

In one aspect, the target service add thresholds may be dynamically changed either automatically or manually based on network conditions, network administrator preference or user preference. In certain aspects, the user may disable the target service add threshold associated with a given service to allow for the service to activated upon activation of the target domain.

In alternate aspects of the methodology 600, the wireless device may maintain or monitor another network while the target network is activate, such that if a target domain serve add threshold is unable to be attained on the target domain (i.e., the service is unable to be activated on the target domain), the wireless device may authorize activation of the desired service on the other network. Monitoring of the other network may include monitoring one or more performance parameters. Example of performance parameters may include, but is not limited to, Received Signal Strength Indication (RSSI), uplink data packet error rate, downlink data packet error rate or uplink transmission retries for a channel operative to provide an associated target network service.

Simultaneous Domain Acquisition Attempts During Power-Up

According to another aspect, the wireless device may be configured such that during power-up two or more domains are attempted to be acquired simultaneously as opposed to in serial. By providing for simultaneous attempts at acquiring a network domain, domain acquisition may be accelerated in those instances in which the process is performed serially and the first attempt at acquiring a network domain is unsuccessful.

Figure 9:
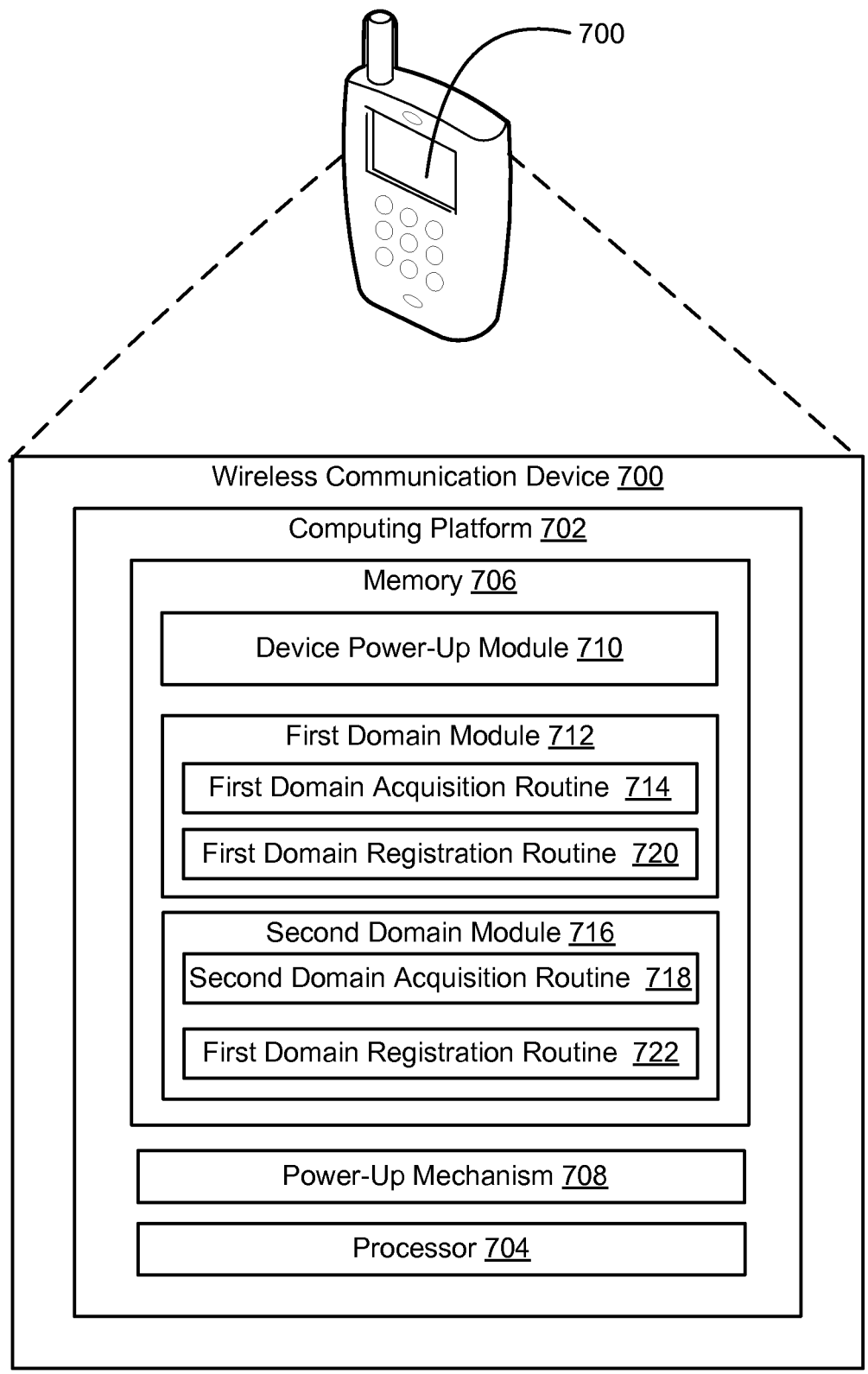
FIG. 9 is a block diagram of a wireless communication device configured for simultaneous domain acquisition attempts during start power-up, according to an aspect.

FIG. 9 provides a block diagram of a wireless communication device configured for simultaneous domain acquisition attempts during start power-up, according to an aspect. The wireless communication device 700 includes a computing platform 702 having at least one processor 704 and a memory 706. The wireless device may additionally include a power-up input mechanism 708 operable to receive a user input for powering-up the device. In other aspects, the device may be powered-up, otherwise referred to as re-booted, automatically without user input as a result of a system failure or the like.

The memory 706 of wireless communication device 700 includes a device power-up module 710 that in communication with processor 704 and is operable to be initiated based on user input to the power-mechanism 708 or the occurrence of another event that automatically triggers power-up/re-boot. Memory 706 additionally includes first domain module 712 and second domain module 716 that in communication with the processor 704 and are operable to acquire and sustain communication with first and second network domains. The first or second domain modules 712, 716 may be a Wireless Local Area Network (WLAN) domain module, such as a Wireless Fidelity (Wi-Fi) domain module, a Bluetooth® domain module or the like. In other aspects, the first and second 712, 716 domain modules may be a cellular network domain module, such as circuit switched $2^{nd}$ Generation (2G) cellular domains, packet-switched 3rd Generation (3G) cellular domains, such as 1X cellular domain module, for example a WiMax cellular domain module, a Long Term Evolution (LTE) cellular domain, or the like. In alternate aspects, the wireless device 700 may be configured with more than two domain modules.

First domain module 712 includes first domain acquisition routine 714 that is operable to attempt to acquire the first domain and the second domain module 716 includes second domain acquisition routine 718 that is operable to attempt to acquire the second domain. In accordance with present aspects, first domain acquisition routine 714 and second domain acquisition routine 718 are implemented simultaneously, otherwise referred to as in parallel, during device power-up processing. Additionally, in instances in which the wireless device 700 is configured with more than two domain modules, the device may be configured to perform two or more, and in some instances all, associated domain acquisition routines simultaneously.

The first domain module 712 additionally may include a first domain registration routine 720 and the second domain module 716 may include a second domain registration module 722. According to present aspects, the first-in-time domain acquisition routine that successfully acquires the associated domain may then implement the associated registration routine in an attempt to register the device with the associated domain. For example, if the first domain acquisition routine 714 is first-in-time in acquiring the associated first domain then, the first domain module 712 may implement the first domain registration routine 720 in an attempt to register the network. In one aspect, if the registration of the first-in-time acquired domain is unsuccessful the device may be configured to re-attempt the registration with the first-in-time acquired domain or, if a second-in-time domain was acquired, attempt to register the second-in-time acquired domain. Thus, according to present aspects, while domain acquisition may be performed simultaneously, domain registration may be performed in series.

Figure 10:
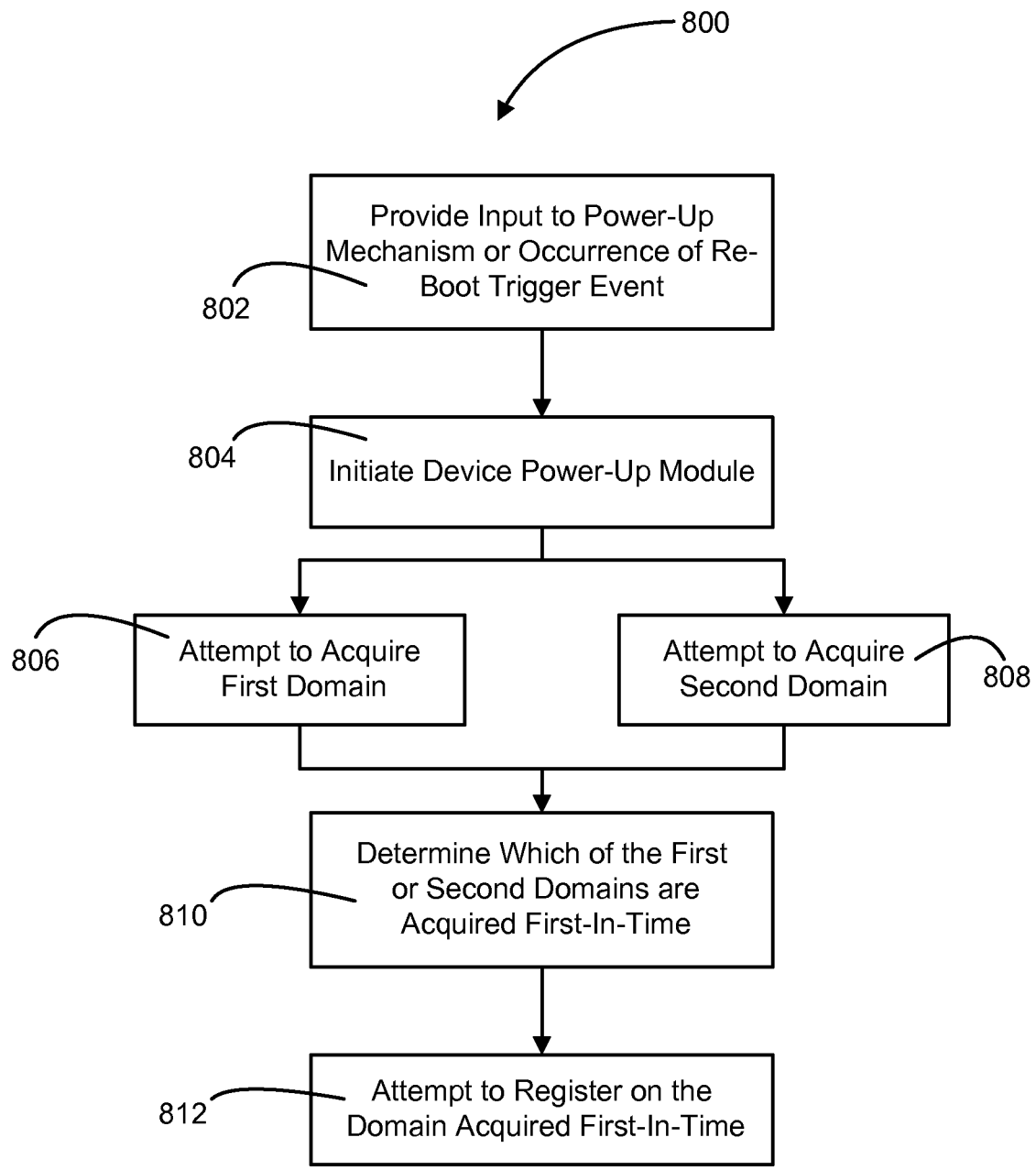
FIG. 10 is a flow diagram of a methodology for simultaneous domain acquisition attempts during power-up, according to an aspect.

FIG. 10 is a flow diagram depicting a methodology 800 for simultaneous domain acquisition attempts during power-up, according to an aspect. At Event 802, a input is provided to a power-up input mechanism or an event occurs that automatically triggers power-up/re-boot of the wireless communication At Event 804, based on the input to the power-up input mechanism or the occurrence of the event that triggers automatic power-up/re-boot the power-up module is initiated on the wireless communication device.

At Events 806 and 808, as the power-up routine is being executed, an attempt to acquire a first domain and an attempt to acquire a second domain are executed simultaneously or in parallel. In aspects in which the first and/or second domain is a WLAN domain, acquiring the domain may include a plurality of consistency checks. In other aspects in which the first and/or second domain is a cellular domain, acquiring the domain may include measuring a pilot Ec/Io signal and determining that a pilot Ec/Io signal add threshold has been met or exceeded. In many instances, WLAN domain acquisition may take a longer period of time than cellular domain acquisition because the WLAN domain consistency checks need ensure that the device is operating in a stable RF environment and that minimal variations exist in the measured WLAN Access Point (AP).

The term "simultaneous" is defined herein as any portion of the associated domain acquisition routines occurring at the same time. In this regard, both the first and second acquisition routines need not be executing simultaneously at all points in time. It is sufficient for the purposes of simultaneous execution that the acquisition routines are executing together at some point in time.

At Event 810, a determination is made as to which of the first or second domains are acquired first-in-time. At Event 812, based on the determination of which domain is acquired first-in-time, an attempt is made to register the domain acquired first-in-time. It should be noted that if the first-in-time acquired domain is successful registered but is not configured on the device as the preferential domain, the device may initiate a hand-off to the preferred domain immediately after successful registration of the first-in-time acquired domain. For example, if a WLAN domain is preferred over a cellular domain and if the cellular domain is the first-in-time acquired domain, once the cellular domain is registered, the device may immediate initiate handoff to the preferred WLAN domain.

Figure 11:
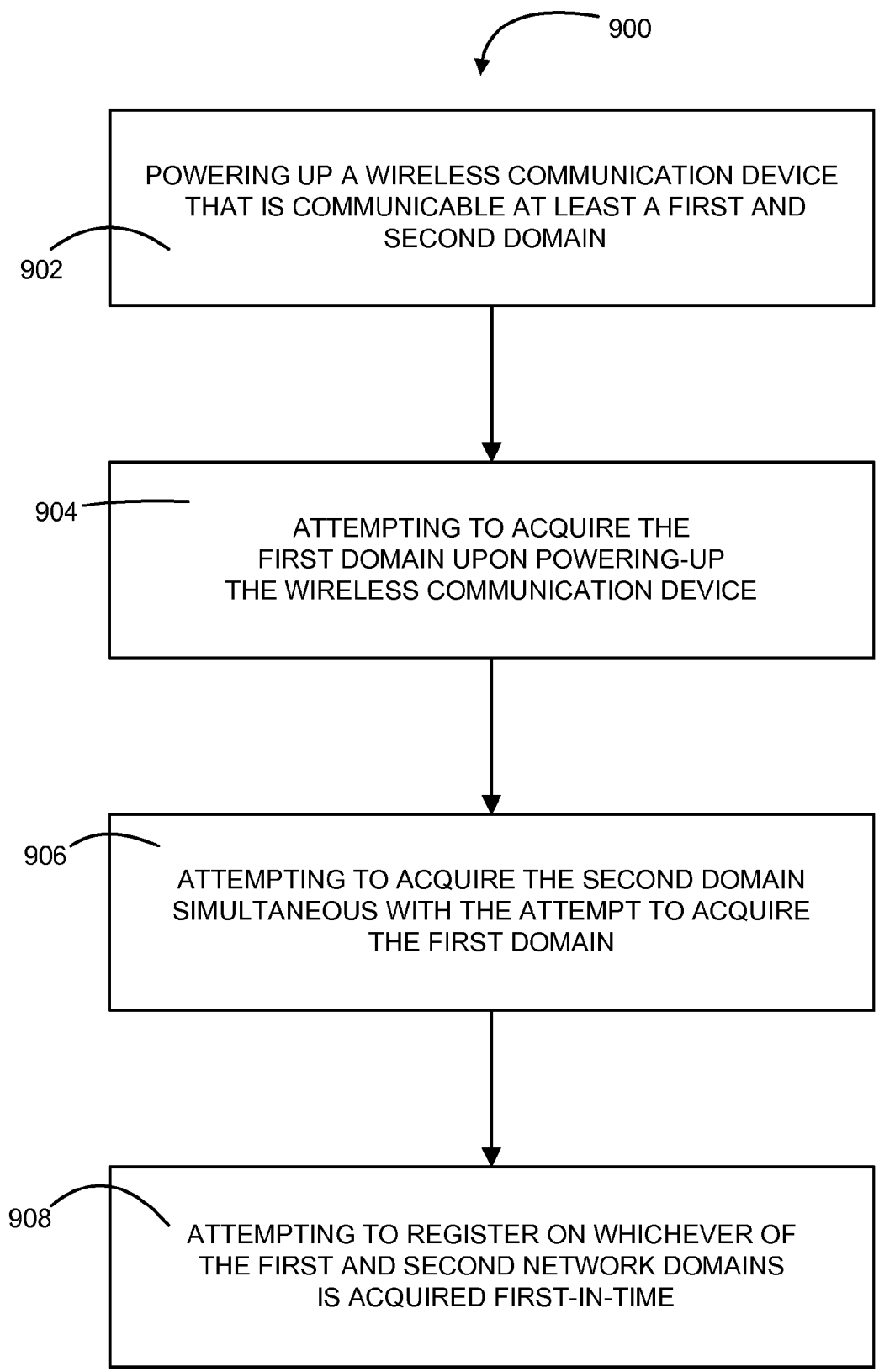
FIG. 11 is a flow diagram of another methodology for simultaneous domain acquisition attempts during power-up, according to an aspect.

Referring to FIG. 11, a methodology 900 is depicted for simultaneous domain acquisition during power-up, according to an aspect. At Event 903, a wireless communication device, which is communicable with at least a first domain and a second domain, is powered-up. The power-up of the wireless communication device may be initiated by user input to a corresponding power-up input mechanism or the power-up may be initiated automatically based on occurrence of a predetermined event, such as system crash or the like.

At Event 904, during power-up, the wireless communication device attempts to acquire the first domain and, at Event 906, during power-up and simultaneous with the attempt to acquire the first domain, the wireless communication device attempts to acquire the second domain. It should be noted that in those aspects in which the first and/or second domain is a WLAN domain, acquiring the first domain may include performing various consistency checks to insure the reliability state of the WLAN domain. In those aspects in which the first and/or second domain is a cellular network domain, acquiring the second domain may include measuring Ec/Io signal and determining that a pilot Ec/Io signal add threshold has been met or exceeded.

At Event 906, domain registration is attempted on whichever of the first or second domains is acquired first-in-time. In some aspect, in which the first domain is a WLAN domain and the second domain is a cellular domain, the cellular domain is more apt to be acquired first-in-time because the cellular acquisition process tends to be less complex than the WLAN acquisition process. Additionally, in some aspects, in which the WLAN domain is the preferred domain, if the cellular domain is the acquired first-in-time and successfully registered, the wireless communication device may be configured to perform a handoff to the WLAN domain after the cellular domain has been registered.

IMS Registration in a Multiple Domain Wireless Communication Device

In many packet-based domains, such as WLAN domains or the like, IMS (Internet protocol Multimedia Subsystem) is used as the mechanism to provide packet-based services. In order for IMS to be used in conjunction with a packet-based service, an IMS registration procedure must be performed. In a prior art multi-domain environment when a wireless device moves from a first domain, such as a WLAN domain to a second domain, such as a cellular domain, the device may be configured to exit the IMS registration, thus requiring re-registration upon re-entry into the WLAN domain or have the IMS registration remain intact while, additionally, the location of the wireless device is continually identified. Since registration procedures are time-consuming and costly, by maintaining dual registration with an active cellular domain and a dormant WLAN domain, the device is able to minimize the number of registrations that may occur and, in particular, the number of IMS registrations that may occur.

In accordance with present aspects, when a wireless device moves from a first domain, such as a WLAN domain to a second domain, such as a cellular domain, the device registers in the cellular or circuit-switched domain and all calls are routed through the Mobile Switch Center (MSC) of the cellular domain. However, when the device moves back to the WLAN domain, although the WLAN domain registration is still valid, the device may perform re-registration to provide for routing of the calls to the IMS/WLAN domain. In other instances, when the device moves back to the WLAN domain and the IMS registration is no longer current, the device may be required to perform a full IMS registration.

Figure 12:
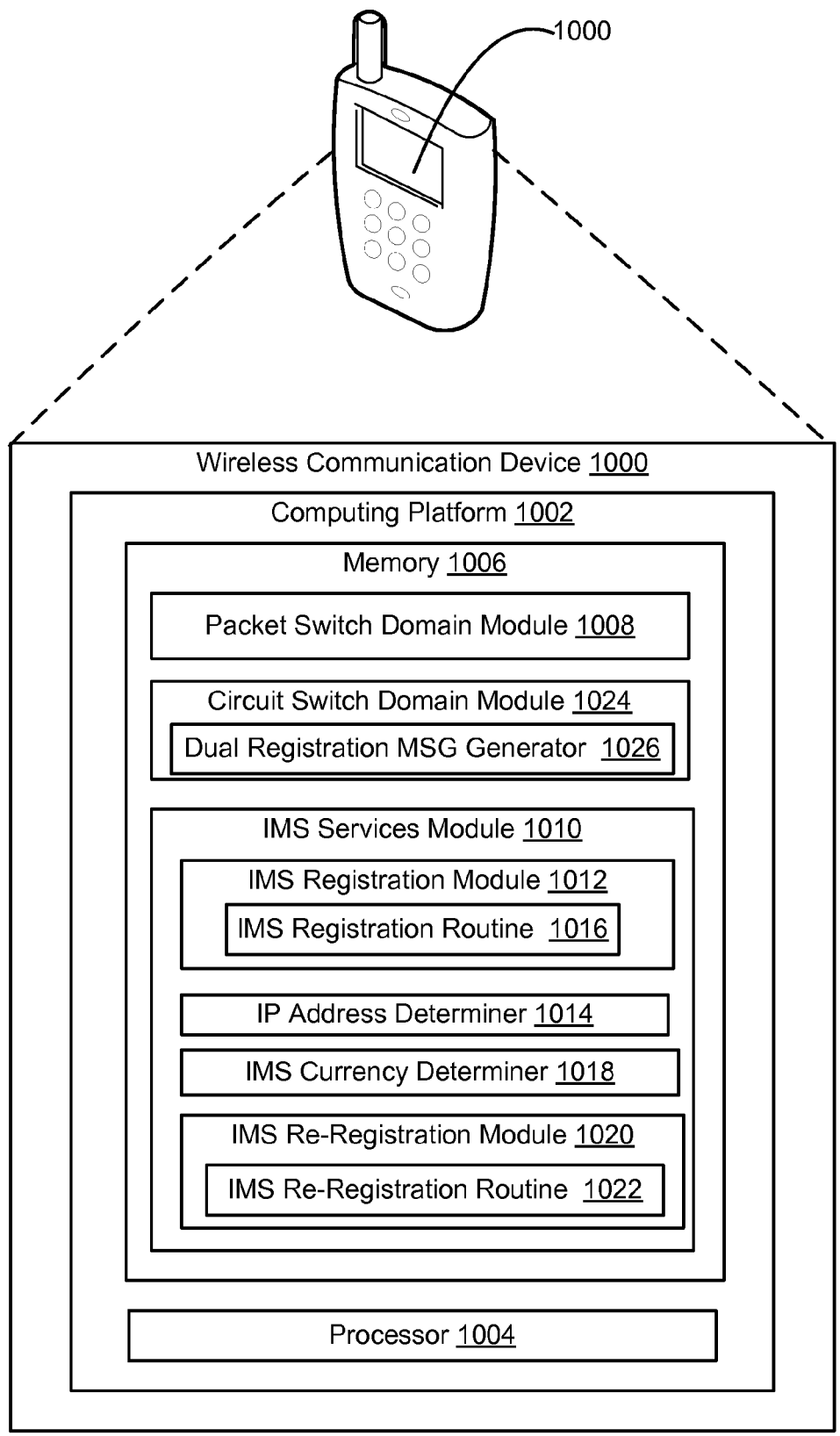
FIG. 12 is a block diagram of a wireless communication device configured for IMS registration in a multi-domain communication environment, according to an aspect.

FIG. 12 is a block diagram of a wireless communication device 1000 configured for IMS registration in a multi-domain communication environment, according to an aspect. The wireless communication device 1000 includes a computing platform 1002 having at least one processor 1004 and a memory 1006. The memory 1006 of wireless communication device 1000 includes at least one packet-switch domain modules 1008 that are in communication with processor 1004. The packet-switch domain module 1008, such as a WLAN domain module or the like, is operable to be activated on the wireless communication device and is configured to provide Internet protocol Multimedia Subsystem (IMS) services.

The memory 1006 of wireless communication device 1000 also includes an IMS services module 1010 that is in communication with the processor 1004 and the packet-switch domain module(s) 1008. The IMS services module 1010 is operable to deliver network services via the packet-switch domain using IMS. Additionally, the IMS services module 1010 includes an IMS registration module 1012 that is operable to determine if an activated packet-switch domain supports IMS services and, if supported then, implement an IP address determiner 1014 operable to determine if the Internet Protocol (IP) address assigned to an IMS application has changed and, if the IP address has changed, implement an IMS registration routine 1016 operable to communicate a registration request to a network-entity in the packet-switch domain. In one aspect, the IMS registration request that is sent to the network-entity may be service-based IMS registration request that is operable to register one or more IMS services independent of registering other IMS services on the packet-switch domain.

In other aspects, the IMS services module 1010 may include an IMS determiner 1018 that is operable to determine if the IMS registration is current if the IP address determiner 1014 determines that the IP address has not changed. If the IMS determiner 1018 determines that the IMS registration is current then IMS services may be received from the packet-switch domain. However, IMS determiner 1018 determines that the IMS registration is not be current then, an IMS re-registration module 1020 including an IMS re-registration routine 1022 may be operable to communicate an IMS re-registration request to a network entity. The IMS re-registration request may be defined as quick refresh of the previously established IMS registration credentials. In this regard, IMS re-registration avoids an authentication procedure as well as other steps in the full registration process. As such, the IMS re-registration procedure is much less time-consuming then the full IMS registration procedure that entails authentication. In one aspect, the IMS re-registration request is further defined as a services-based re-registration request that is operable to re-register one or more IMS services independent of re-registering other IMS services. In certain aspects, re-registration may be performed within a predetermined time interval and, if the time interval expires or if the re-registration process fails the IMS registration routine 1016 is invoked to provide for a full registration procedure including authentication.

In certain aspects, if the IMS registration module determines that IMS services are not supported then, if circuit-switch domains, such as cellular domains, are supported, then the wireless device activates the circuit-switch domain module 1024. In those aspects in which the circuit switched domain supports IMS, such 3GPP2, the circuit-switch domain module may be configured with a dual registration message generator that is operable to generate a message, such as an SMS message or the like that notifies the circuit-switch domain that services are to be provided by the circuit-switch domain although the packet-switch domain registration remains active. In this regard, since the IMS registration remains active it may possible for the wireless communication to IMS re-register as opposed to fully IMS register when the device returns to the packet-switch domain.

Figure 13:
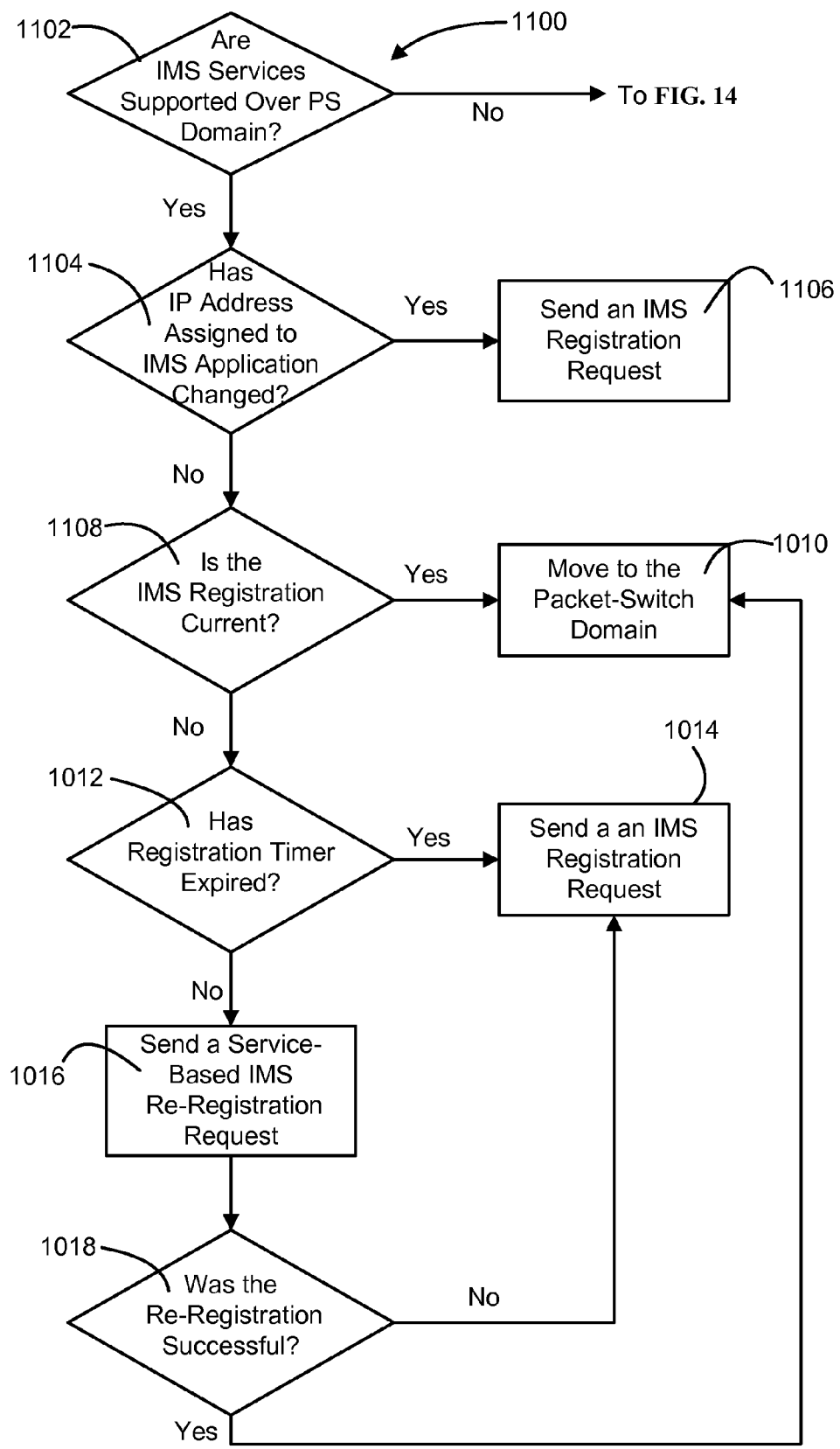
FIGS. 13 and 14 are a flow diagram of a methodology for IMS registration in a multi-domain wireless environment, according to an aspect.
Figure 14:
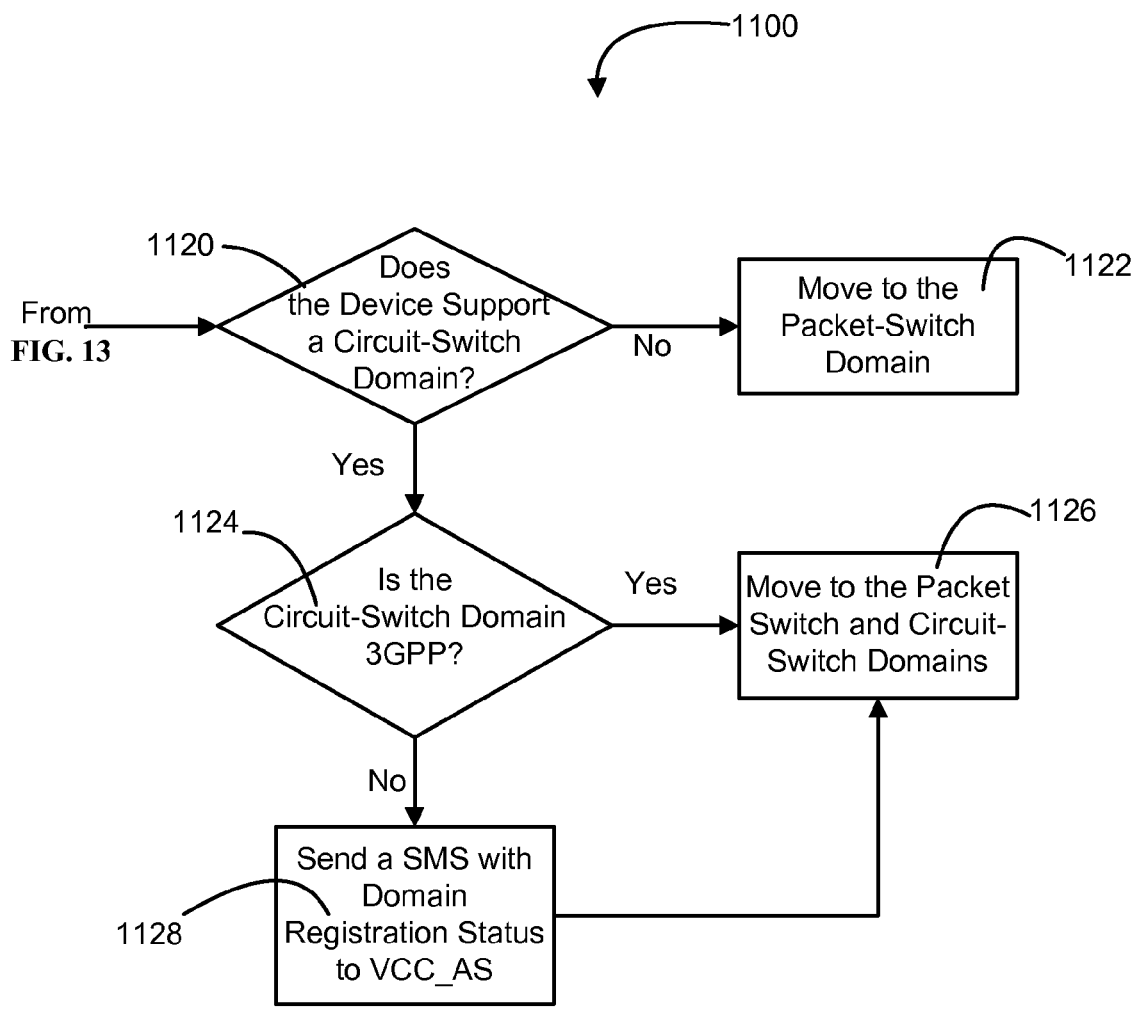

Referring to FIGS. 13 and 14 a flow diagram is presented of a methodology 1100 for IMS registration in a multi-domain wireless environment, according to an aspect. According to FIG. 13, at Decision 1102, a determination is made as to whether IMS services are supported over the packet-switch domain, for example, a WLAN domain. If IMS services are supported then, at Decision 1104, a determination is made as to whether the Internet Protocol (IP) address assigned to the IMS application has changed. The IP address may change if the wireless device crosses sub-layer boundaries or in other known or future known instances. If the IP address has changed then, at Event 1106, the wireless communication device sends an IMS registration to a packet-switch entity. In one aspect, the IMS registration may be a service-based IMS registration that includes feature tags that identify the services supported over the packet-switch domain. Service-based IMS registration provides for each service, such as Voice over IP (VoIP), Short Message Service (SMS), video-telephony or the like, to be registered independent of another service.

If the IP address has not changed, such as may be the case if the wireless device is moving between WLAN access points, then the wireless device may attempt to re-register the device as opposed to performing a full registration process. At Decision 1108, a determination is made as to whether the IMS registration is current. If the IMS registration is current and up-to-date, as determined by a timer or the like, then, at Event 1010, the wireless device moves into the packet-switch domain. If the IMS is determined to not be current or is otherwise not present in the packet-switched domain then, at Decision 1012, a determination is made as to whether the registration timer has expired. If the registration timer has expired then, at Event 1014, an IMS registration is communicated to a packet-switch entity. If the registration timer has not expired then, at Event 1016 an IMS re-registration request is sent to a packet-switch entity. Re-registration differs from registration in that re-registration only requires a quick refresh of the previously established IMS registration credentials. In one aspect, the re-registration request may be a service-based IMS re-registration operable to re-register one or more IMS services independent of re-registering other IMS services on the packet-switch domain.

At Decision 1018, a determination is made as to whether the re-registration was successful. If the re-registration process is unsuccessful, at Event 1014, a full registration request is sent to a packet-switch entity. If the re-registration process is successful then, at Event 1010, the wireless device moves to the packet switch domain.

It should be noted that while the present aspects are described herein in conjunction with IMS registration and registration, the aspects are also relevant to other services that may require registration on a packet-switched domain, such as a WLAN domain or the like.

Referring to FIG. 14, if the wireless device does not support IMS services over the packet-switch domain and the device is still IMS registered, at Decision 1120, a determination is made as to whether the device supports a circuit-switch domain. If the device does not support a circuit-switch domain then, at Event 1122, the wireless device moves into the packet-switch domain. If the device does support a circuit-switch domain then, at Decision 1124, a determination is made as to whether the circuit switch domain is a 3GPP ($3^{rd}$ Generation Partnership Project) circuit-switch domain. If the circuit-switched domain is a 3GPP circuit-switched domain then, at Event 1126, the wireless device moves to the circuit switch domain and the packet switch domain. 3GPP does not support IMS services and therefore the core network will respond by first trying WLAN service and then trying cellular service to deliver services.

If the circuit-switch domain is not 3GPP but rather 3GPP2 ($3^{rd}$ Generation Partnership Project 2), at Event 1128, the wireless device sends a message, such as a SMS message or the like, to a Voice Call Application Server (VCC-AS) that indicates the need to move all services to the circuit-switch domain and indicating that the IMS registration on the packet-switch domain is still alive/intact. In this regard the message notifies the circuit switch network that although the packet switch network is still actively registered, services are to be provided via the circuit-switch domain. Once the message is sent then, at Event 1130, the wireless devices moves to the circuit switch domain. When the wireless domain subsequently moves back to the packet-switched domain, the device may attempt to IMS re-register as opposed to fully IMS register per the flow depicted in FIG. 13.

Figure 15:
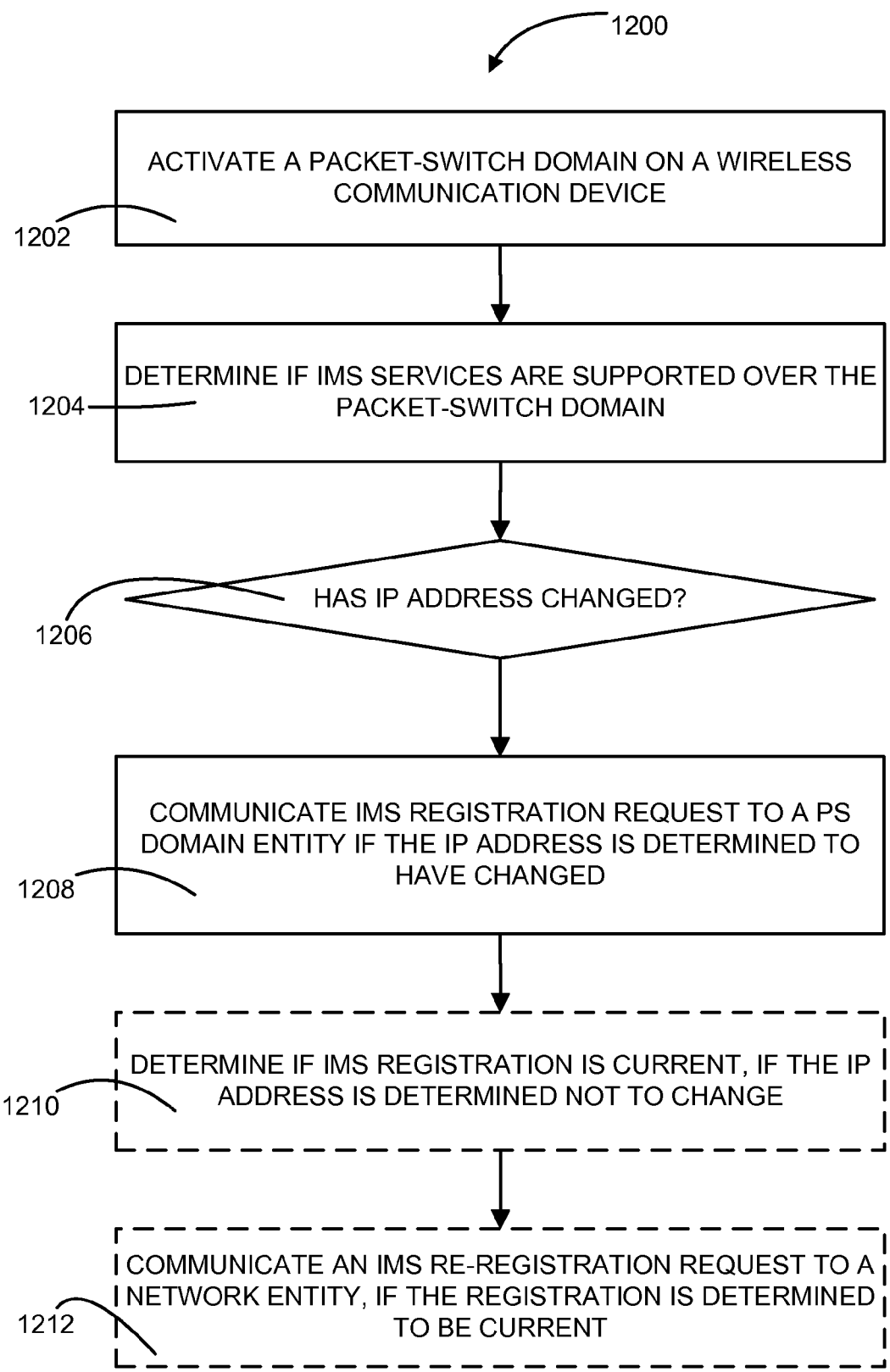
FIG. 15 is a flow diagram of another methodology for IMS registration in a multi-domain wireless environment, according to an aspect.

Referring to FIG. 15 a flow diagram is depicted of a methodology 1200 for IMS registration in a multi-domain wireless communication device, according to an aspect. At Event 1202, the packet-switch domain, such as a WLAN domain or the like, is activated on a wireless communication device. At Event 1204, a determination is made that IMS services are supported over the packet-switch domain.

At Decision 1206, a determination is made as to whether the IP address assigned to the IMS application has changed. At Event 1208, if the IP address has determined to change then an IMS registration request is sent to a packet-switch domain entity. In one aspect, the IMS registration request may be a service-based IMS registration requests that provides for services to be registered independent of other services provided on the packet-switch domain.

At optional Event 1210, the IMS registration is determined to be current based on the IP address determined to not have changed. At optional Event 1212, an IMS re-registration request is communicated to a network entity, based the registration is determined to be current. Re-registration allows the wireless device to quickly refresh the previously established IMS registration while avoiding the full registration process.

Figure 16:
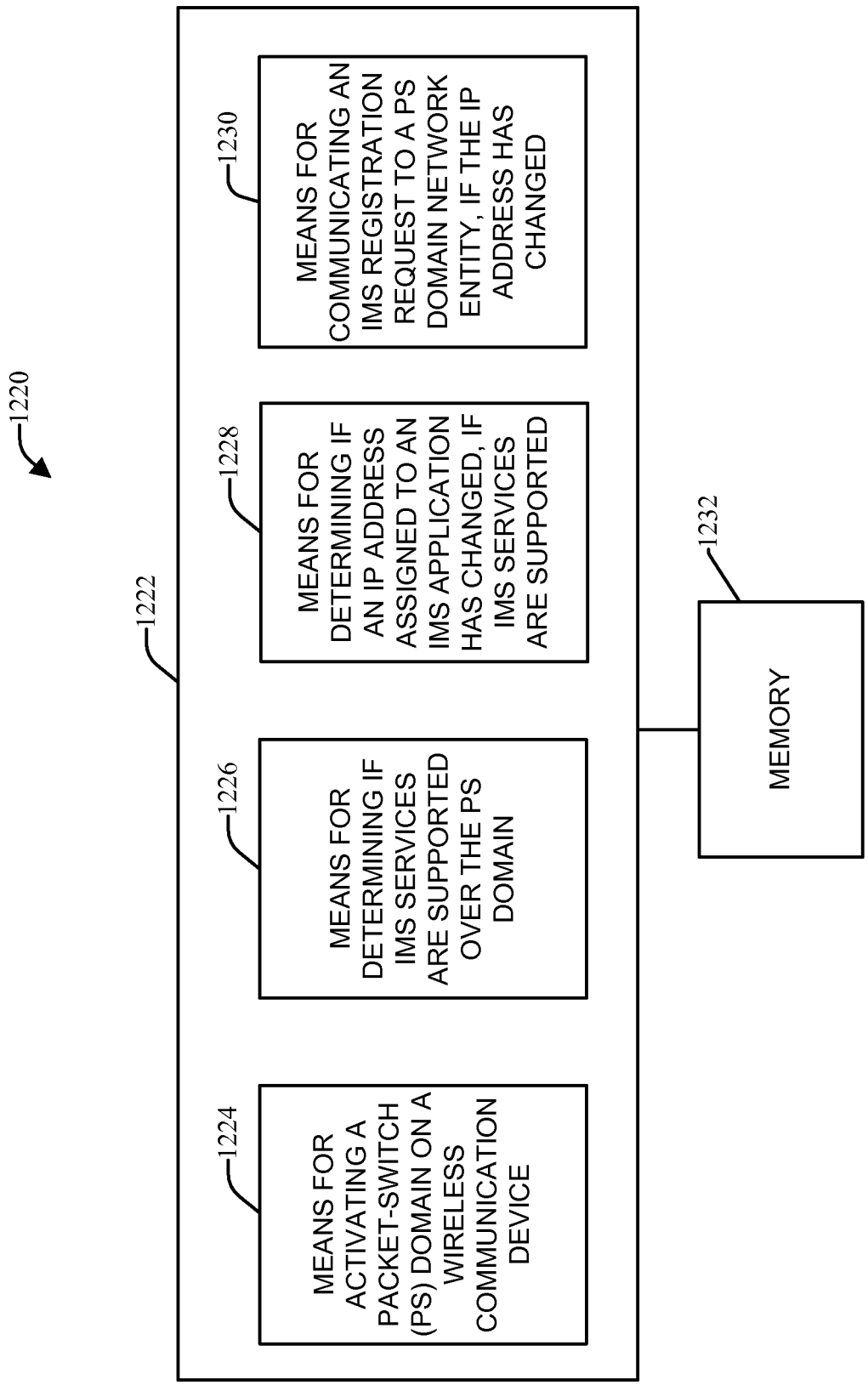
FIG. 16 is a block diagram of an apparatus for IMS registration in a multi-domain wireless environment, according to an aspect.

Referring to FIG. 16 a block diagram is presented of an apparatus for IMS registration in a multi-domain wireless environment, according to an aspect. The apparatus 1220 includes a logical grouping 1222 of means for carrying out the processes described herein which are in communication with memory 1232. Included within the logical grouping are means 1224 for activating a Packet-Switch (PS) domain on a wireless communication device and means 1226 for determining if IMS services are supported over the packet-switch domain. As previously noted some pack-switch domains may not support IMS services and if the PS domain does not support IMS registration, means may optionally be provided for moving to a cellular domain (not shown in FIG. 16).

The logical grouping 1222 of means within apparatus 1220 also include means 1128 for determining if an IP address assigned to an IMS application has changed, if IMS services are determined to be supported. The logical grouping 1222 also includes means 1230 for sending an IMS registration request to a network entity within the PS domain, if the IP address has been determined to have changed. If the IP has not changed, the device will move to the PS domain. The IMS registration request may be a registration request that quickly refreshes previously established IMS registration credentials or, if the re-registration has timed-out or fails, the request may be a full registration request.

Sequential Paging Over a Non-Preferred Domain

In those aspects in which the wireless device in IMS registered on the packet-switch domain and simultaneously registered on the circuit switch domain but are unable to notify the circuit switch of such via a messaging procedure (such as described above) and, thus, the circuit switch domain is unaware of the dual registration state, a method or mechanism is needed to insure that pages over the non-preferred domain are received properly by the wireless device. Such is the case when the circuit-switch domain is the 3GPP circuit switch domain that characteristically does not support IMS. In accordance with a present aspect, the wireless device will sequentially be paged first over the preferred network and, if the page is not received, then, over the non-preferred network.

For example, if a wireless communication device is configured for multiple domain communications and the device is currently registered to receive a service, for example, voice service over either a first domain or a second domain and, thus is listening for pages over both the first and second domain. In addition, the wireless device is configured such that the first domain is the preferred domain. In one aspect, the first domain may be a WLAN domain and the second domain may be a cellular domain. In accordance with an aspect, a domain entity may be configured to page first on the domain which the network believes the device to be currently active on and, if the page is not received by the wireless device then, page the wireless device on the second domain.

If the page is received over the non-preferred domain, the wireless device may be configured to transfer the call in-traffic to the preferred domain if the preferred domain is still within coverage range. However, if the wireless device is not configured to allow for call transferring the call may be retained in the non-preferred domain. In such instances, once the call is terminated, the wireless device may refresh its registration with the preferred domain so that the network subsequently uses the preferred domain to page the wireless device.

Figure 17:
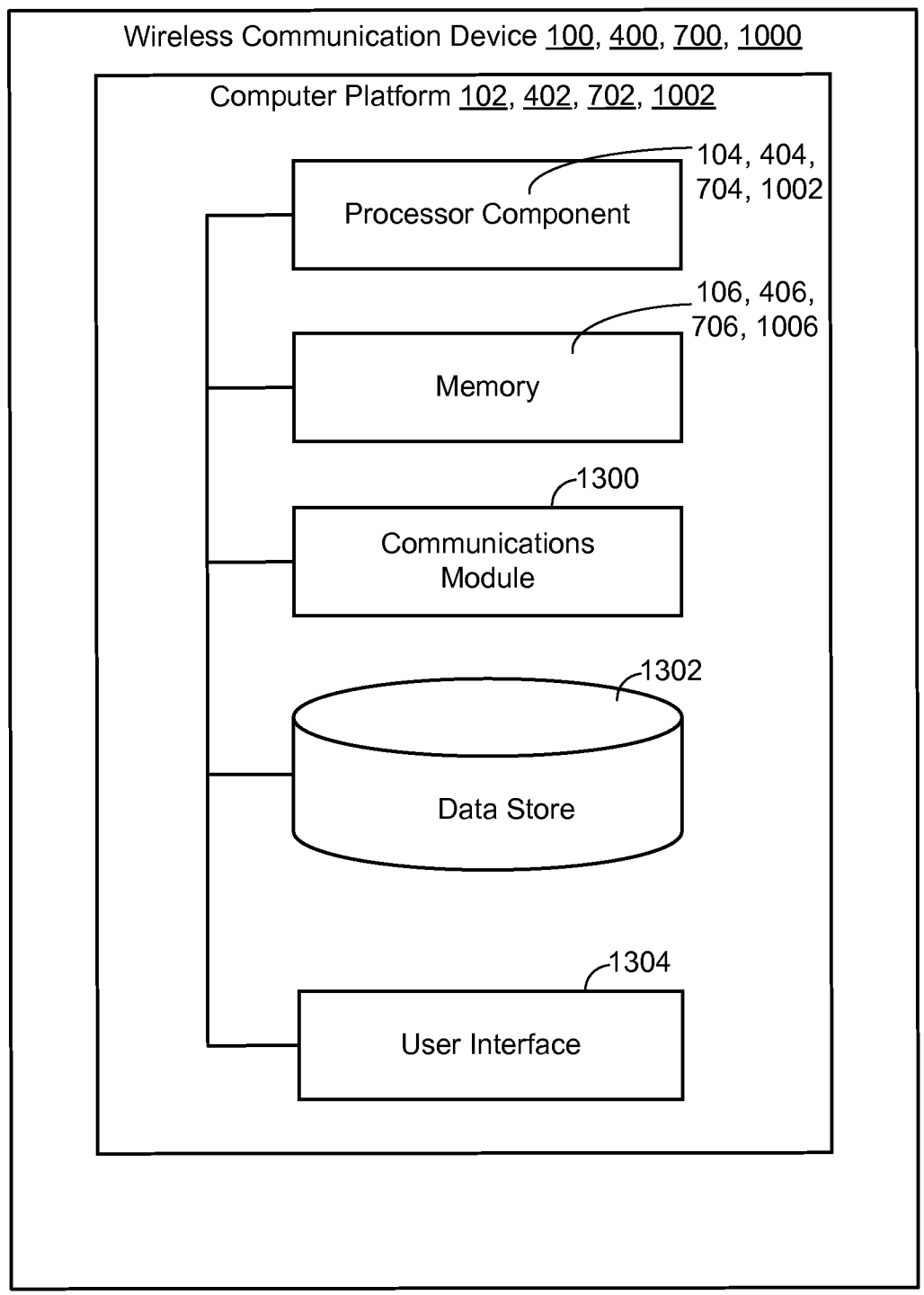
FIG. 17 is a block diagram highlighting details of a wireless communication device that may be used in conjunction with present aspects.

Referring to FIG. 17, in one aspect, wireless communication device 100, 400, 700 and 1000, may comprise a mobile communication device, such as mobile telephone or the like, operable on a wireless communication system. As can be appreciated, there are a variety of wireless communication systems which often employ different spectrum bandwidths and/or different air interface technologies. Exemplary systems include CDMA (CDMA 2000, EV DO, WCDMA), OFDM, or OFDMA (Flash-OFDM, 802.20, WiMAX), FDMA/TDMA (GSM) systems using FDD or TDD licensed spectrums, peer-to-peer (e.g., mobile-to-mobile) ad hoc network systems often using unpaired unlicensed spectrums, and 802.xx wireless LAN or BLUETOOTH techniques.

As previously noted, wireless device 100, 400, 700 and 1000 includes processor component 104, 404, 704 and 1004 for carrying out processing functions associated with one or more of components and functions described herein. Processor component 104, 404, 704 and 1004 can include a single or multiple sets of processors or multi-core processors. Moreover, processing component 104, 404, 704 and 1004 can be implemented as an integrated processing system and/or a distributed processing system. Additionally, processing component 104, 404, 704 and 1004 may include one or more processing subsystems, such as processing subsystems capable of determining link quality or setting up link bindings according to present aspects, or any other processing subsystem needed to carry out present aspects.

Wireless communication device 100, 400, 700 and 1000 further includes a memory 106, 406, 706 and 1006, such as for storing local versions of applications/modules being executed by processor component 104, 404, 704 and 1004. Memory 106, 406, 706 and 1006 can include random access memory (RAM), read only memory (ROM), and a combination thereof. Additionally, in some aspects (not shown in FIG. 17), memory 106, 406, 706 and 1006 may include target domain modules, serving domain modules and the like.

Further, access terminal 100, 400, 700 and 1000 includes a communications module 1300 that provides for establishing and maintaining communications with one or more parties utilizing hardware, software, and services as described herein. Communications module 1300 may carry communications between components on wireless device 100, 400, 700 and 1000, as well as between wireless device 100, 400, 700 and 1000 and external network devices, such as target/serving network entities located across a communications network and/or devices serially or locally connected to wireless device 100, 400, 700 and 1000.

Additionally, wireless device 100, 400, 700 and 1000 may further include a data store 1302, which can be any suitable combination of hardware and/or software that provides for mass storage of information, databases, and programs employed in connection with aspects described herein. Optionally, in some aspects, data store 1302 may serve to store the add/drop threshold for domains and/or domain services (not shown in FIG. 17).

Wireless Device 100, 400, 700 and 1000 may additionally include a user interface component 1304 operable to receive inputs from a user of wireless device 100, 400, 700 and 1000, and to generate outputs for presentation to the user. User interface component 1304 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 1304 may include one or more output devices, including but not limited to a display, a speaker, a haptic feedback mechanism, a printer, any other mechanism capable of presenting an output to a user, or any combination thereof.

Figure 18:
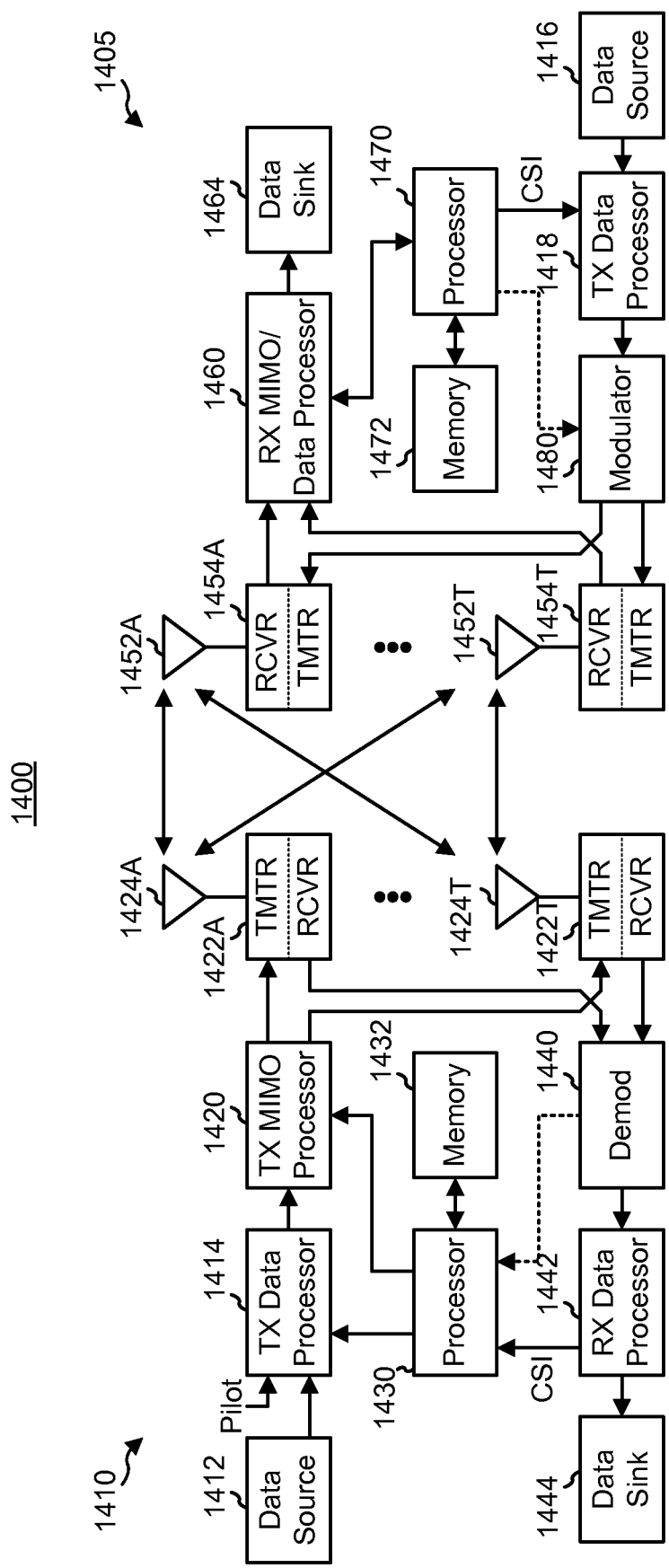
FIG. 18 depicts a schematic diagram of a transmitter and receiver in a multiple access wireless communication system, according to various aspects presented herein.

FIG. 18 illustrates a transmitter and receiver in a multiple access wireless communication system 1400 according to various aspects presented herein. Wireless communication system 1400 depicts one base station and one user device for sake of brevity. However, it is to be appreciated that the system can include more than one base station and/or more than one user device, wherein additional base stations and/or user devices can be substantially similar or different from the exemplary base station and user device described below. In addition, it is to be appreciated that the base station and/or the user device can employ the systems and/or methods described herein to facilitate wireless communication there between.

At transmitter system 1410, traffic data for a number of data streams is provided from a data source 1412, which includes the codebook of present aspects, to a transmit (TX) data processor 1414. In some aspects, each data stream is transmitted over a respective transmit antenna. TX data processor 1414 formats, codes, and interleaves the traffic data for each data stream based on a particular coding scheme selected for that data stream to provide coded data. In some aspects, TX data processor 1414 applies beam-forming weights to the symbols of the data streams based upon the user to which the symbols are being transmitted and the antenna from which the symbol is being transmitted. In some aspects, the beam-forming weights may be generated based upon channel response information that is indicative of the condition of the transmission paths between the access network and the access terminal. The channel response information may be generated utilizing CQI (Channel Quality Indicator) information or channel estimates provided by the user. Further, in those cases of scheduled transmissions, the TX data processor 1414 can select the packet format based upon rank information that is transmitted from the user.

The coded data for each data stream may be multiplexed with pilot data using OFDM (Orthogonal Frequency Division Multiplexing) techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed or provided by processor 1430. In some aspects, the number of parallel spatial streams may be varied according to the rank information that is transmitted from the user.

The modulation symbols for the data streams are provided to a TX MIMO processor 1420, which may further process the modulation symbols (e.g., for OFDM). TX MIMO processor 1420 provides NT symbol streams to NT transmitters (TMTR) 1422a through 1422t. In some aspects, TX MIMO processor 1420 applies beam-forming weights to the symbols of the data streams based upon the user to which the symbols are being transmitted and the antenna from which the symbol is being transmitted from that users channel response information.

Each transmitter 1422 receives and processes a respective symbol stream to provide one or more analog signals, and further conditions (e.g. amplifies, filters, and upconverts) the analog signals to provide a modulated signal suitable for transmission over the MIMO channel. NT modulated signals from transmitters 1422a through 1422t are transmitted from NT antennas 1424a through 1424t, respectively.

At receiver system 1450, the transmitted modulated signals are received by NR antennas 1452a through 1452t and the received signal from each antenna 1452 is provided to a respective receiver (RCVR) 1454. Each receiver 1454 conditions (e.g., filters, amplifies, and downconverts) a respective received signal, digitizes the conditioned signal to provide samples, and further processes the samples to provide a corresponding "received" symbol stream.

An RX data processor 1460 then receives and processes the NR received symbol streams from NR receivers 1454 based on a particular receiver processing technique to provide the rank number of "detected" symbol streams. The processing by RX data processor 1460 is described in further detail below. Each detected symbol stream includes symbols that are estimates of the modulation symbols transmitted for the corresponding data stream. RX data processor 1460 then demodulates, deinterleaves, and decodes each detected symbol stream to recover the traffic data for the data stream. The processing by RX data processor 1460 is complementary to that performed by TX MIMO processor 1320 and TX data processor 1414 at transmitter system 1410.

The channel response estimate generated by RX processor 1460 may be used to perform space, space/time processing at the receiver, adjust power levels, change modulation rates or schemes, or other actions. RX processor 1460 may further estimate the signal-to-noise-and-interference ratios (SNRs) of the detected symbol streams, and possibly other channel characteristics, and provides these quantities to a processor 1470. RX data processor 1460 or processor 1470 may further derive an estimate of the "effective" SNR for the system. Processor 1370 then provides estimated channel information (CSI), which may comprise various types of information regarding the communication link and/or the received data stream. For example, the CSI may comprise only the operating SNR. The CSI is then processed by a TX data processor 1418, which also receives traffic data for a number of data streams from a data source 1416, modulated by a modulator 1480, conditioned by transmitters 1454a through 1454t, and transmitted back to transmitter system 1410.

At transmitter system 1410, the modulated signals from receiver system 1450 are received by antennas 1424, conditioned by receivers 1422, demodulated by a demodulator 1440, and processed by a RX data processor 1442 to recover the CSI reported by the receiver system. The reported CSI is then provided to processor 1430 and used to (1) determine the data rates and coding and modulation schemes to be used for the data streams and (2) generate various controls for TX data processor 1414 and TX MIMO processor 1420.

At the receiver, various processing techniques may be used to process the NR received signals to detect the NT transmitted symbol streams. These receiver processing techniques may be grouped into two primary categories (i) spatial and space-time receiver processing techniques (which are also referred to as equalization techniques); and (ii) "successive nulling/equalization and interference cancellation" receiver processing technique (which is also referred to as "successive interference cancellation" or "successive cancellation" receiver processing technique).

A MIMO channel formed by the NT transmit and NR receive antennas may be decomposed into $N_S$ independent channels, with $N_S \leq \min\{N_T, N_R\}$. Each of the $N_S$ independent channels may also be referred to as a spatial subchannel (or a transmission channel) of the MIMO channel and corresponds to a dimension.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Thus, aspects are provided for improving the mobility of wireless communication devices between one network domain and another network domain, specifically, but not limited to, between a Wireless Local Area Network (WLAN), such as a WiFi network, a Bluetooth® network or the like, and a cellular network (i.e., circuit-switch and packet-switched domains), such as 1X, LTE, 2G, 3G cellular networks and the like. Present aspects provide for services to be moved seamlessly and in a reliable manner between the cellular and WLAN domains in order to minimize service disruption for the end user and provide the requisite Quality of Service (QoS) for the different applications. The aspects herein presented provide for various mechanisms that serve to improve the decision points related to when and what technology each service is expected to be associated with and provides better techniques to move the wireless communication device between cellular and WLAN domains when in-traffic and when idle.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for registering a wireless communication device for IP Multimedia Subsystem (IMS) services in a packet-based domain, comprising:

activating a packet-switch domain on a wireless communication device;

determining whether IMS services are supported over the packet-switch domain;

determining if an Internet Protocol (IP) address assigned to an IMS application has changed, based on IMS services determined to be supported, and communicating an IMS registration request to a network entity within the packet-switch domain, if the IP address is determined to have changed; and determining if the wireless communication device supports a circuit-switched domain, if IMS services are determined to be not supported, and activating the circuit-switch domain if it is determined that the device supports a circuit-switched domain and communicating a message to a network entity in the circuit-switched domain that is operable to inform the circuit-switched domain that all network services are to provided by the circuit-switched domain.

2. The method of claim 1, wherein communicating an IMS registration request further comprises communicating a service-based IMS registration request that is operable to register one or more IMS services independent of registering other IMS services.

3. The method of claim 1, further comprising determining if IMS registration is current, if the IP address is determined to not have changed.

4. The method of claim 3, further comprising receiving IMS services from the packet-switch domain, if the IMS registration is determined to be current.

5. The method of claim 3, further comprising communicating an IMS re-registration request to a network entity within the packet-switch domain, if the IMS registration is determined to not be current.

6. The method of claim 5, wherein communicating an IMS re-registration request further defines the IMS re-registration as refresh of previously established IMS registration credentials.

7. The method of claim 5, wherein communicating an IMS-re-registration request further comprises communicating a service-based IMS re-registration request that is operable to re-register one or more IMS services independent of re-registering other IMS services.

8. The method of claim 5, wherein communicating an IMS re-registration further comprises determining if a registration timer has expired and communicating an IMS re-registration request to a network entity, if the registration timer is determined to have not expired.

9. The method of claim 5, further comprising communicating a registration request to a network entity in the packet-switch domain, if the re-registration request is determined to have failed.

10. The method of claim 1, further comprising maintaining an IMS registration in the packet-switch domain while network services are provided by the circuit-switch domain.

11. The method of claim 1, further comprising receiving a first page on the packet-switch domain while active on the circuit-switch domain, and, sequentially receiving a second page on the circuit-switch domain.

12. At least one processor configured to register a wireless communication device for IP Multimedia Subsystem (IMS) services in a packet-based domain, comprising:

a first module for activating a packet-switch domain on a wireless communication device;

a second module for determining if IMS services are supported over the packet-switch domain;

a third module for determining if an Internet Protocol (IP) address assigned to an IMS application has changed, if IMS services are determined to be supported;

a fourth module for communicating an IMS registration request to a network entity within the packet-switch domain, if the IP address is determined to have changed;

a fifth module for determining if the wireless communication device supports a circuit-switched domain, if IMS services are determined to be not supported; and a sixth module for activating the circuit-switch domain if it is determined that the device supports a circuit-switched domain and communicating a message to a network entity in the circuit-switched domain that is operable to inform the circuit-switched domain that all network services are to provided by the circuit-switched domain.

13. The at least one processor of claim 12, wherein the fourth module further communicates a service-based IMS registration request that is operable to register one or more IMS services independent of registering other IMS services.

14. The at least one processor of claim 12, wherein the third module further determines if IMS registration is current, if the IP address is determined to not have changed.

15. A non-transitory computer program product, comprising:
a computer-readable medium comprising:
code for causing at least one computer to activate a packet-switch domain on a wireless communication device;
code for causing at least one computer to determine if IMS services are supported over the packet-switch domain;
code for causing at least one computer to determine if an Internet Protocol (IP) address assigned to an IMS application has changed, if IMS services are determined to be supported; and code for causing at least one computer to communicate an IMS registration request to a network entity within the packet-switch domain, if the IP address is determined to have changed;
code for determining if the wireless communication device supports a circuit-switched domain, if IMS services are determined to be not supported; and
code for activating the circuit-switch domain if it is determined that the device supports a circuit-switched domain and code for communicating a message to a network entity in the circuit-switched domain that is operable to inform the circuit-switched domain that all network services are to provided by the circuit-switched domain.

16. The computer program product of claim 15, wherein said computer-readable medium further comprises code for causing at least one computer to communicate a service-based IMS registration request that is operable to register one or more IMS services independent of registering other IMS services.

17. The computer program product of claim 15, wherein said computer-readable medium further comprises code for causing at least one computer to determine if IMS registration is current, if the IP address is determined to not have changed.

18. An apparatus, comprising:
means for activating a packet-switch domain on a wireless communication device;
means for determining if IMS services are supported over the packet-switch domain;
means for determining if an Internet Protocol (IP) address assigned to an IMS application has changed, if IMS services are determined to be supported;
means for communicating an IMS registration request to a network entity within the packet-switch domain, if the IP address is determined to have changed; and
means for determining if the wireless communication device supports a circuit-switched domain, if IMS services are determined to be not supported; and
means for activating the circuit-switch domain if it is determined that the device supports a circuit-switched domain and means for communicating a message to a network entity in the circuit-switched domain that is operable to inform the circuit-switched domain that all network services are to provided by the circuit-switched domain.

19. The apparatus of claim 18, further comprising means for communicating a service-based IMS registration request that is operable to register one or more IMS services independent of registering other IMS services.

20. The apparatus of claim 18, further comprising means for determining if IMS registration is current, if the IP address is determined to not have changed.

21. A wireless communication device, comprising:
a computer platform including a processor and a memory in communication with the processor;
a packet-switch domain module stored in the memory and in communication with the processor, wherein the packet-switch domain module is operable to be activated on the wireless communication device;
a circuit-switched domain module stored in the memory and in communication with the processor, wherein the circuit-switched module is operable to be activating if the packet-switch domain is determined to not support IMS services; and
an IP Multimedia Subsystem (IMS) services module stored in the memory and in communication with the processor,
wherein the IMS services module is operable to determine that the activated packet-switch domain supports IMS services and wherein the IMS services module includes an IP address determiner that is operable to determine if the IP address assigned to an IMS application has changed and an IMS registration routine operable to determine if the IP address has been changed, communicate an IMS registration request to a network entity in the packet-switch domain, if the IP address is determined to have been changed,
wherein the circuit-switched domain module comprises a dual registration MSG generator operable to generate a message operable to inform the circuit-switched domain that all network services are to provided by the circuit-switched domain and that packet-switch IMS registration remains active.

22. The wireless device of claim 21, wherein the IMS registration routine is further operable to communicate a service-based IMS registration request that is operable to register one or more IMS services independent of registering other IMS services.

23. The wireless device of claim 21, wherein the IMS services module further comprises an IMS currency determiner operable for determining if IMS registration is current, if the IP address determiner determined that the IP address is not changed.

24. The wireless device of claim 23 wherein the IMS service module is further operable to receive IMS services from the packet-switch domain, if the IMS currency determiner determines that IMS registration is current.

25. The wireless device of claim 23, wherein the IMS services module further comprises an IMS re-registration routine operable for communicating an IMS re-registration request to a network entity within the packet-switch domain, if the IMS registration is determined to not be current.

26. The wireless device of claim 25, wherein the IMS re-registration routine is further operable to communicate an IMS re-registration request that is refreshes previously established IMS registration credentials.

27. The wireless device of claim 25, wherein the IMS re-registration routine is further operable to communicate a service-based IMS re-registration request that is operable to re-register one or more IMS services independent of re-registering other IMS services.

28. The wireless device of claim 25, wherein the IMS re-registration routine is further operable to determine if a registration timer has expired and communicate the IMS re-registration request to the network entity, if the registration timer is determined to have not expired.

29. The wireless device of claim 25, further the IMS registration routine is further operable to communicate a registration request to a network entity in the packet-switch domain, if the re-registration request is determined to have failed.

30. The wireless communication device of claim 21, wherein the wireless communication device is further operable to receive a first page on the packet-switch domain while active on the circuit-switch domain and the circuit-switch domain, and, sequentially receive a second page on the circuit-switch domain.

* * * * *